(12) United States Patent
Pouliot

(10) Patent No.: US 6,588,207 B1
(45) Date of Patent: Jul. 8, 2003

(54) STEP-LESS, HYDRAULIC POWER TRANSMISSION

(76) Inventor: Alphonse A. Pouliot, 51 Gale Ave., Pittsfield, MA (US) 01201

( * ) Notice: Subject to any disclaimer, the term of this patent is extended or adjusted under 35 U.S.C. 154(b) by 0 days.

(21) Appl. No.: 10/112,116

(22) Filed: Mar. 28, 2002

Related U.S. Application Data

(60) Provisional application No. 60/279,867, filed on Mar. 29, 2001.

(51) Int. Cl.$^7$ .............................................. F16D 39/00
(52) U.S. Cl. ...................................... 60/487; 418/201.3
(58) Field of Search ........................... 60/487; 418/197, 418/201.3

(56) References Cited

U.S. PATENT DOCUMENTS

| | | | |
|---|---|---|---|
| 4,726,244 A | | 2/1988 | de Pencier |
| 4,729,261 A | | 3/1988 | Tervola |
| 4,776,779 A | * | 10/1988 | Crump ........................ 418/197 |
| 4,843,908 A | | 7/1989 | Koshimo |
| 4,885,956 A | | 12/1989 | Yale |
| 5,108,275 A | * | 4/1992 | Sager ........................ 418/201.3 |
| 5,194,052 A | | 3/1993 | Ueda et al. |
| D343,180 S | | 1/1994 | Monagan |
| 5,525,116 A | * | 6/1996 | Ra et al. ........................ 475/275 |
| 5,538,484 A | | 7/1996 | Bell |
| 5,853,343 A | | 12/1998 | Eggert et al. |
| 5,951,425 A | | 9/1999 | Iida et al. |
| 6,361,289 B1 | * | 3/2002 | Hennes et al. ........... 418/201.3 |

FOREIGN PATENT DOCUMENTS

| | | |
|---|---|---|
| WO | WO 96/30673 | 10/1996 |
| WO | WO 98/48200 | 10/1998 |

* cited by examiner

Primary Examiner—Edward K. Look
Assistant Examiner—Michael Leslie
(74) Attorney, Agent, or Firm—McCormick, Paulding & Huber LLP

(57) ABSTRACT

The step-less hydraulic power transmission of the present invention comprises essentially two gear pumps including a first pump that is reversible and continuously variable, in which the per revolution output is directly proportional to engine RPM. The first pump is driven by an engine and delivers a continuous flow of oil through a closed loop to a second gear pump which drives an output shaft. The direction of rotation in the second gear pump is determined by the polarity of oil flow delivered to it by the first gear pump. The gear tooth shape is such that, at any point along the gear axis, there is only one point of contact between a first gear and a second gear.

21 Claims, 35 Drawing Sheets

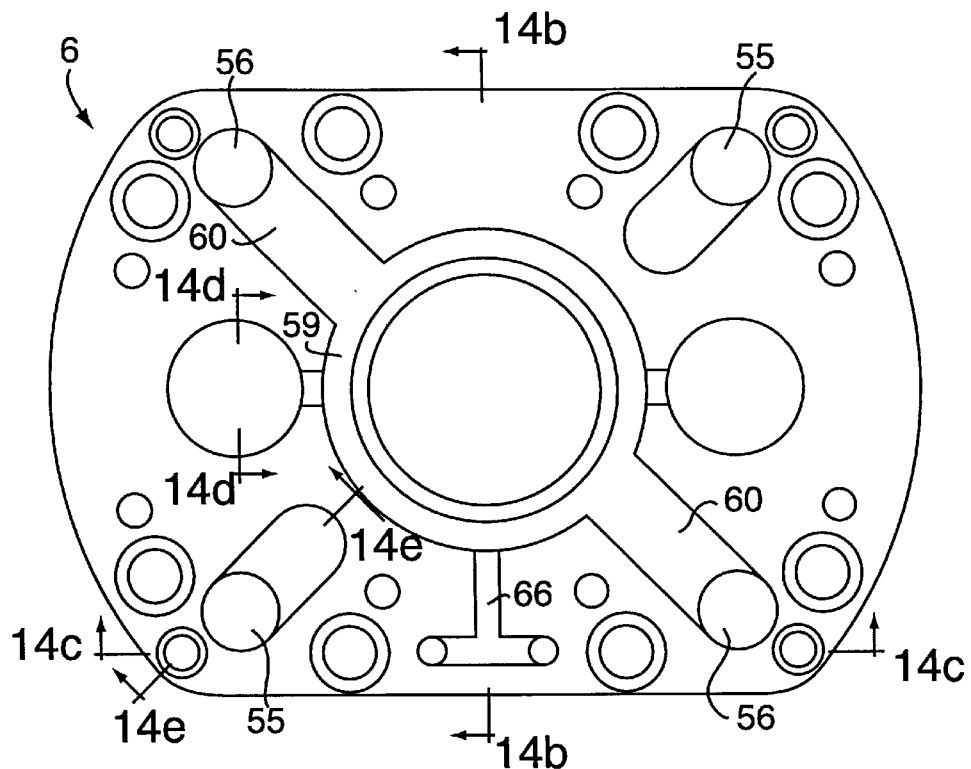
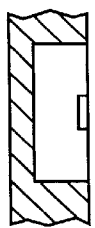
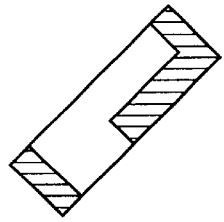
FIG. 14a
FIG. 14d
FIG. 14e
FIG. 14b
FIG. 14c

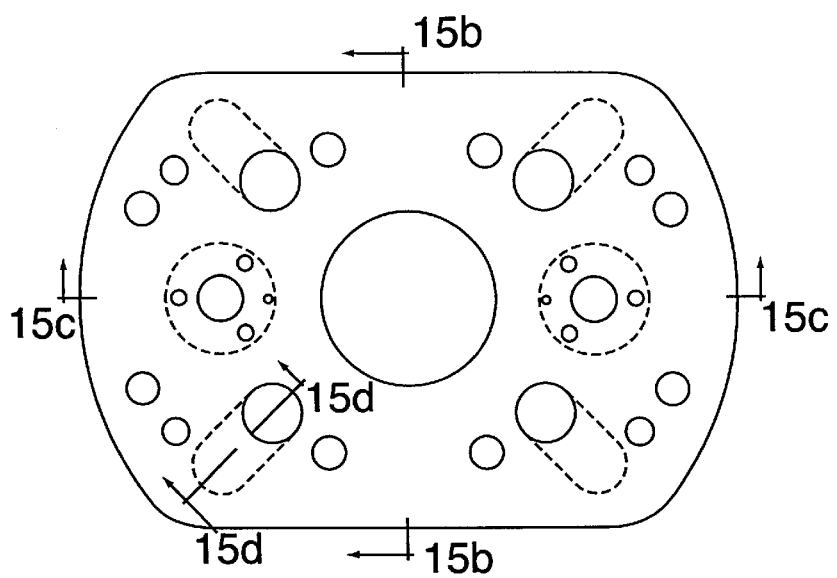
FIG. 15a
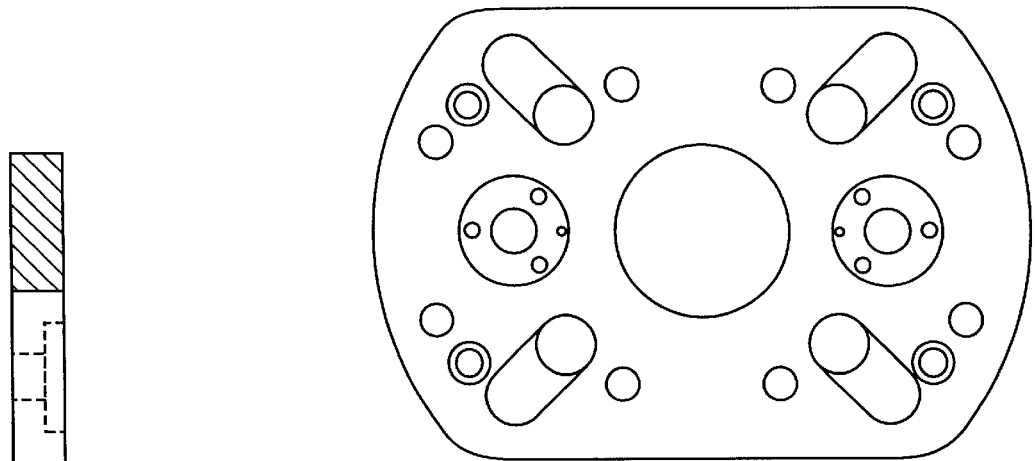
FIG. 15e
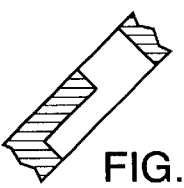
FIG. 15b
FIG. 15d
FIG. 15c

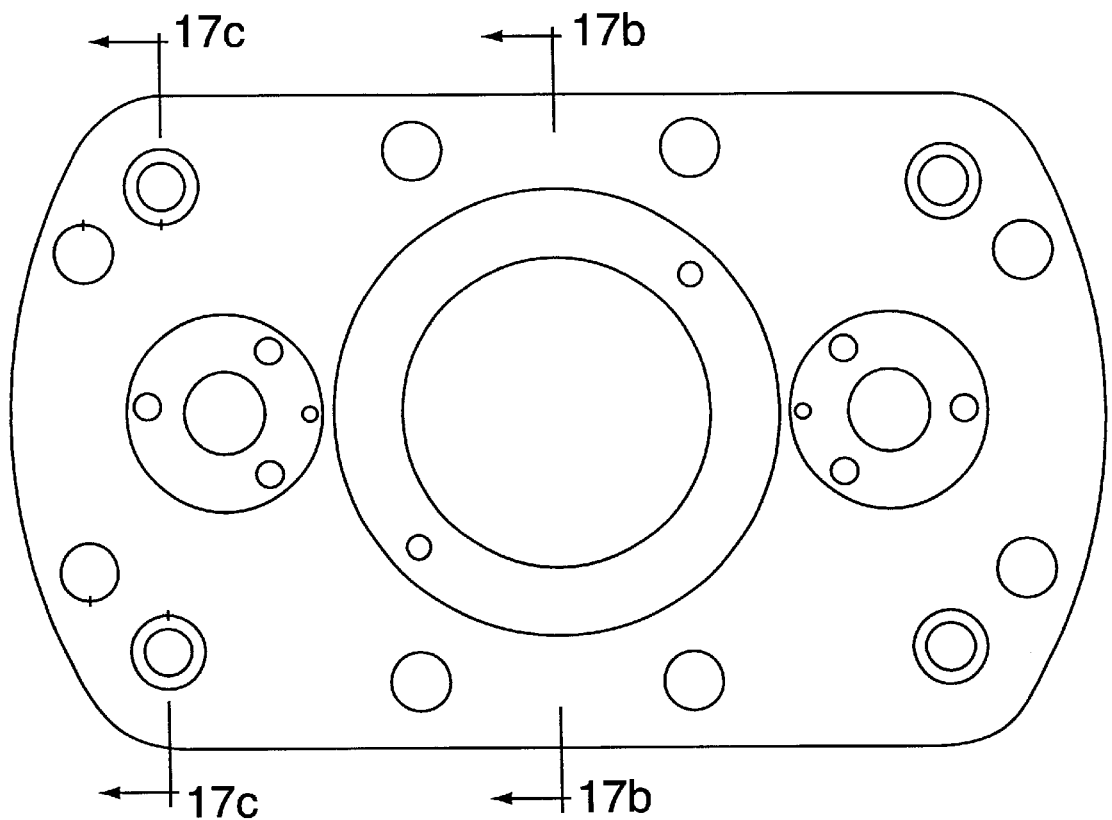
FIG. 17a
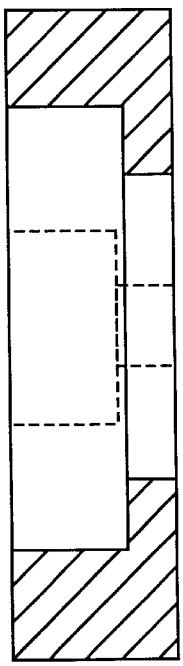 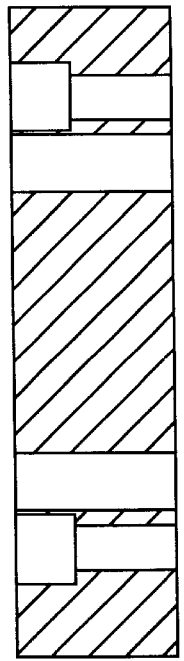
FIG. 17b  FIG. 17c

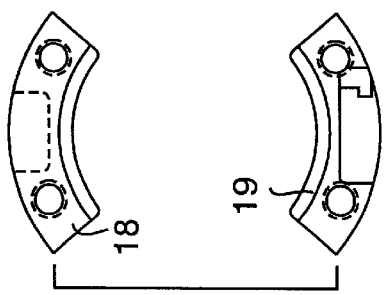
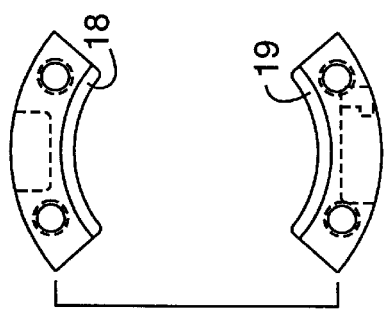
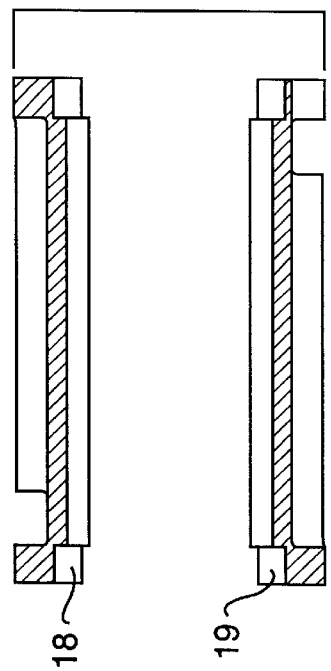
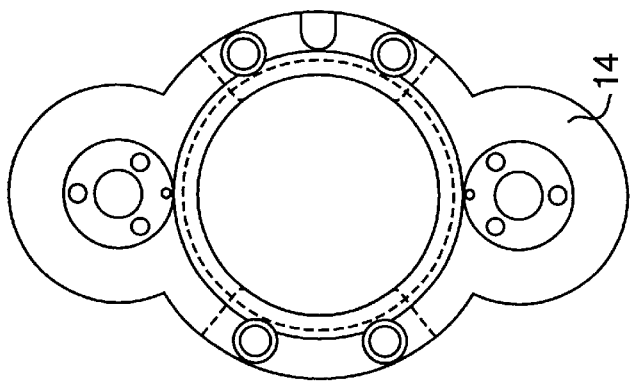
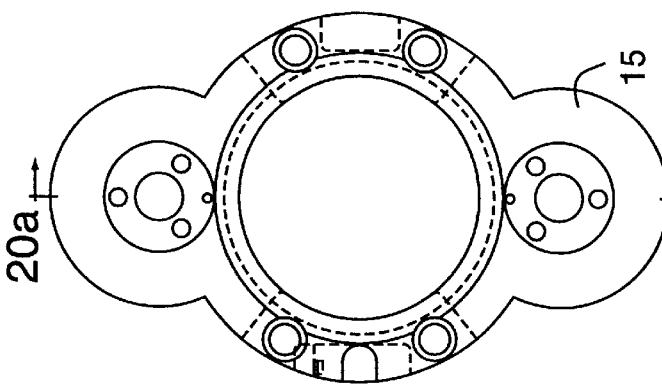
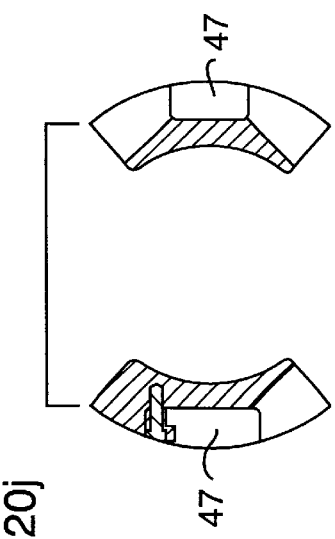

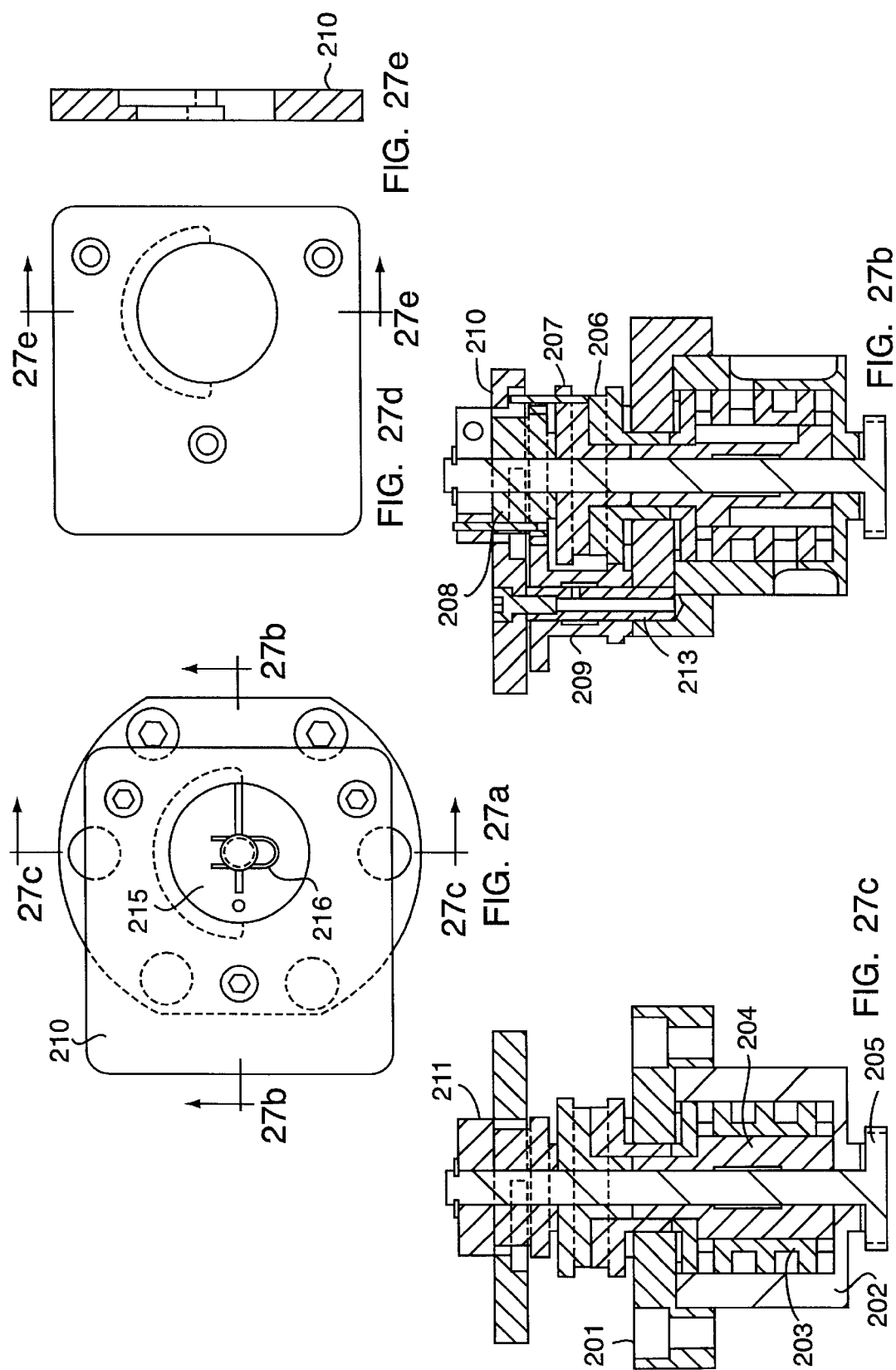

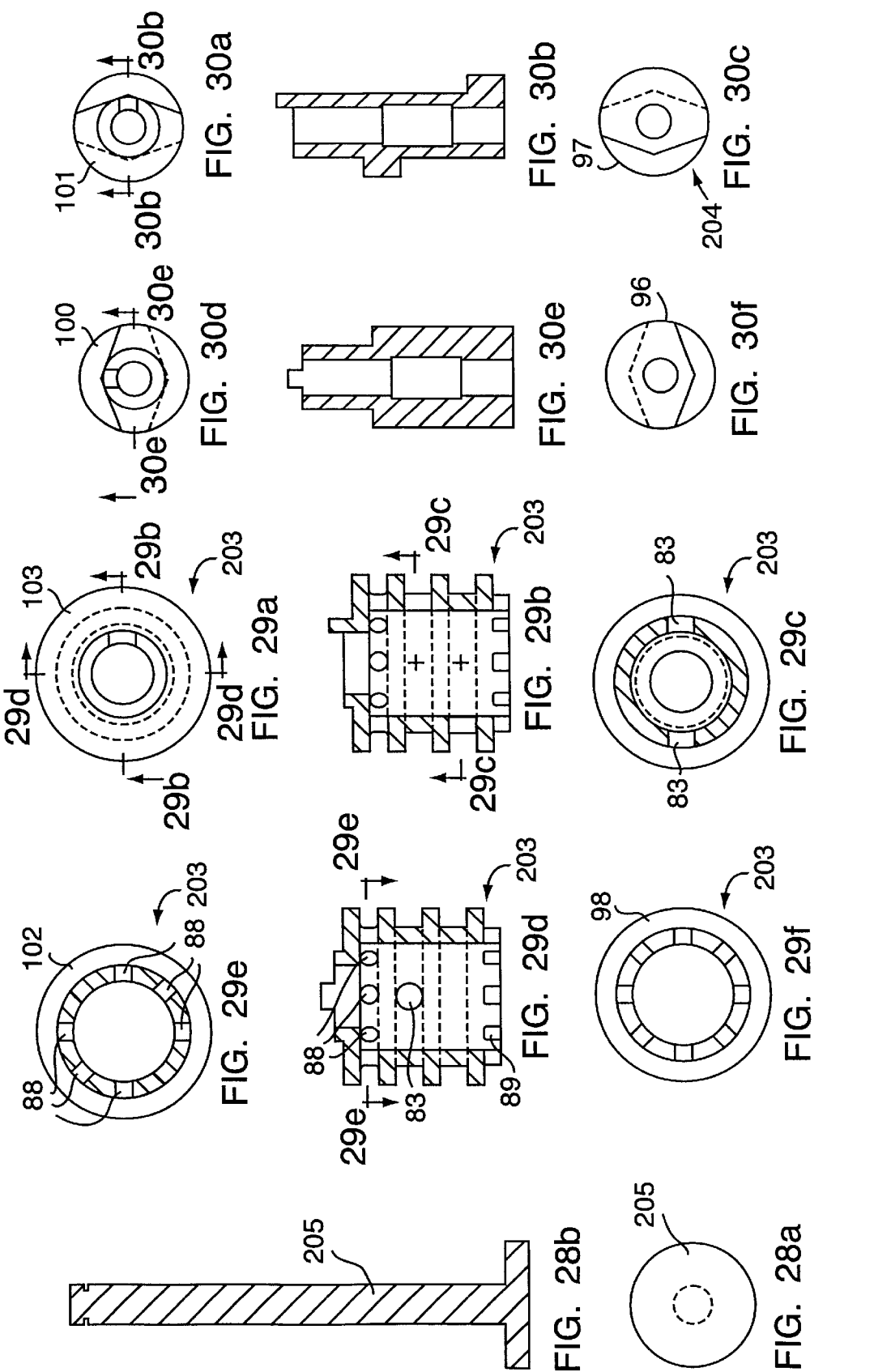

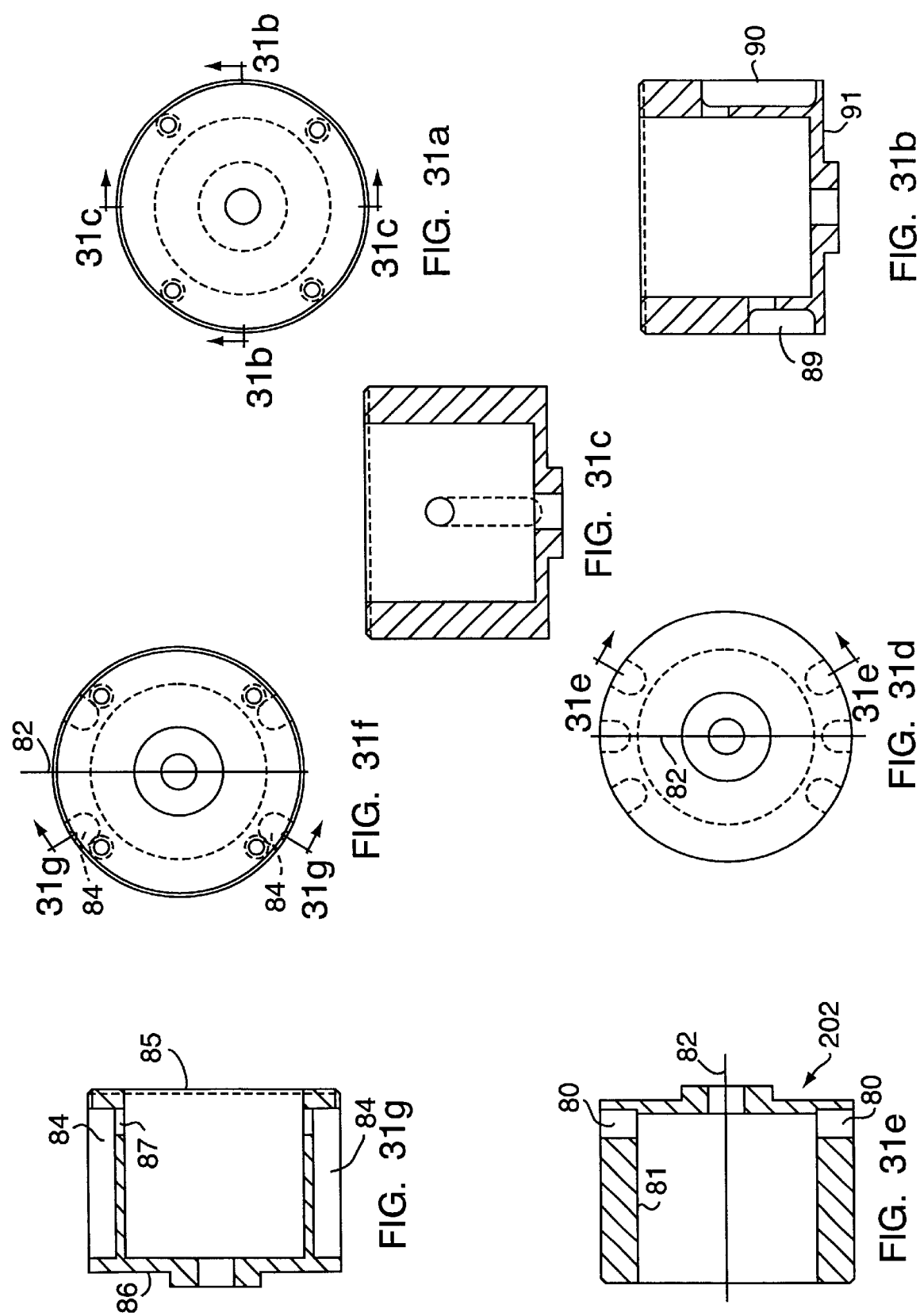

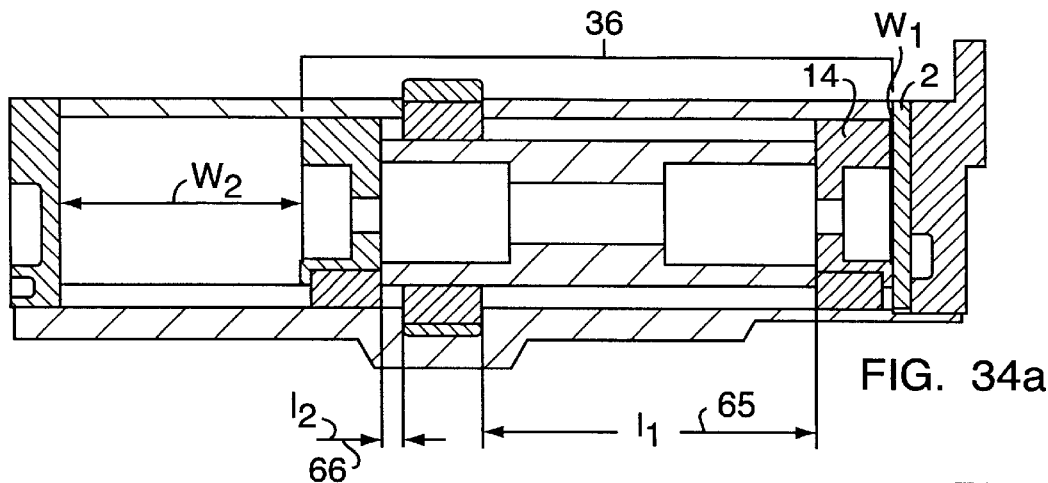
FIG. 34a
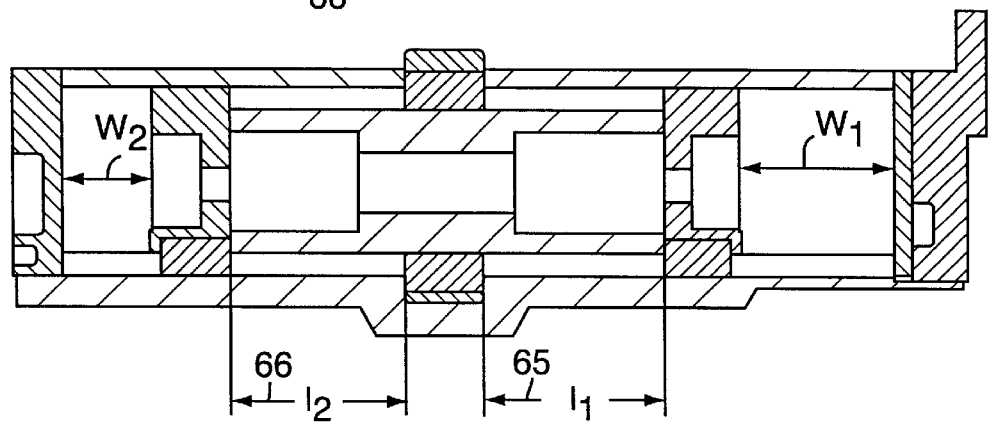
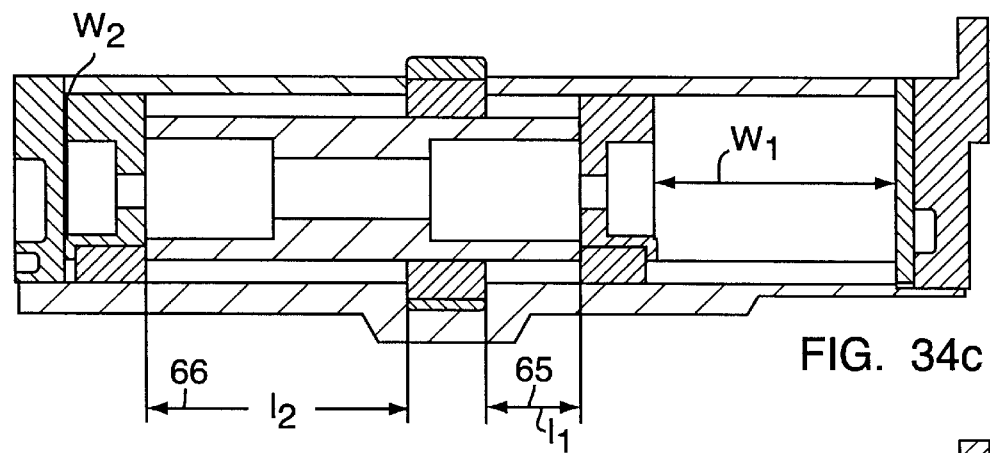
FIG. 34c
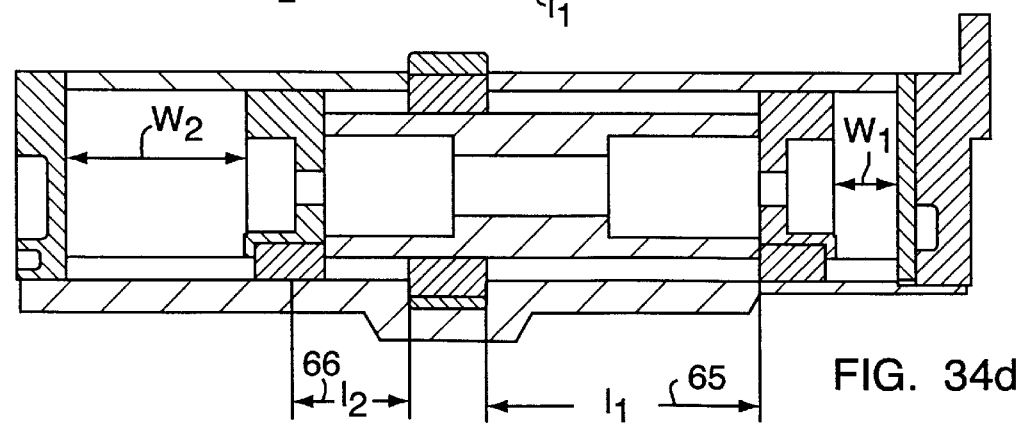
FIG. 34d

STEP-LESS, HYDRAULIC POWER TRANSMISSION

CROSS REFERENCE TO RELATED APPLICATION

This application claims priority to pending provisional application Ser. No. 60/279,867, filed Mar. 29, 2001, herein incorporated by reference in its entirety.

FIELD OF THE INVENTION

This invention relates to transmission systems, and more particularly to a continuously variable hydraulic transmission system.

BACKGROUND OF THE INVENTION

The purpose of any transmission system, including a continuously variable transmission system, is to change the gear ratio of engine to wheels. For each set of engine parameters, such as engine RPM, vehicle speed, and accelerator and brake position, maximum engine efficiency is achieved at only one gear ratio. Variations in load and the finite number of gear steps in a conventional transmission result in less than optimum engine efficiency. Continuously variable transmissions, however, allow the engine to be operated at the most efficient speed.

Continuously variable transmission systems are known in the prior art. Prior art continuously variable transmission systems are generally of three types, each with advantages and limitations. The first type has a belt-driven configuration in which the transmission system includes metal-banded belts that transmit drive torque. This type of transmission is limited by the tensile strength of the steel bands and is used typically in low torque engines.

A second type of continuously variable transmission system has two sets of planetary steerable rollers housed between an inner and outer toroidal shaped disc, one driving and one driven. By tilting the steerable rollers, the relative diameters of engagement of the input and output toroidal discs can be varied to achieve a desired speed ratio. Because of very high contact pressures in such transmissions, ordinary transmission oil cannot be used and a high shear stiffness traction fluid is used to prevent metal to metal contact. The complexity and cost of the toroidal disc transmissions have so far precluded widespread use. The third type of continuously variable transmission system found in the prior art is typically limited to heavy duty applications because of cost and weight. This third type is basically a hybrid of a toroidal transmission and a hydrostatic transmission that can transfer power in any of three modes—purely hydraulic, combined hydraulic and mechanical, or purely mechanical.

BRIEF DESCRIPTION OF THE DRAWINGS

FIGS. 14a–e are schematic views of the interior of the reverse end plate of a preferred embodiment of the present invention.

FIGS. 15a–e are schematic views of the non-variable end plate of a preferred embodiment of the present invention.

FIG. 17a–c are schematic views of the non-variable end plate according to a preferred embodiment of the present invention.

FIGS. 20a–j are schematic sectional views of parts of the idler assembly according to a preferred embodiment of the present invention.

FIGS. 27a–d are schematic views of the control apparatus according to a preferred embodiment of the present invention.

FIG. 28 is a schematic view of the rack driven gear of the control apparatus depicted in FIG. 27.

FIGS. 29 shows sectional views of the sleeve with ports of the control apparatus depicted in FIG. 27.

FIGS. 30 shows sectional views of the control valve of the control apparatus depicted in FIG. 27.

FIGS. 31 show sectional views of the channel sleeve of the control apparatus depicted in FIG. 27.

FIGS. 34a–d are four partial sections of the idler assembly according to the present invention.

SUMMARY OF THE INVENTION

According to a preferred embodiment of the present invention, a hydraulic power transmission system having a gear assembly includes a first driven gear with a plurality of helical gear teeth, and a second gear having a plurality helical gear teeth that mesh with the teeth of the first gear at only one contact point along the axial length of the gears.

According to another aspect of the invention, a method for providing a continuously variable hydraulic transmission system having a gear assembly, an engine crankshaft, an output shaft, a hydraulic fluid and a control apparatus includes the steps of:

(a) shaping a first driven gear of said gear assembly to include a plurality of first helical gear teeth radiating outwardly therefrom;

(b) shaping a second gear of said gear assembly to include a plurality of second helical gear teeth radiating outwardly therefrom, said first helical gear teeth and said second helical gear teeth being selectively meshable with one another; and (c) forming each of said first helical gear teeth and each of said second helical gear teeth so as to define an outer periphery, wherein contact between any of said first helical gear teeth and any of said second helical gear teeth occurs at only one contact point on said outer periphery of any of said first helical gear teeth and any of said second helical gear teeth when said first driven gear and said second gear are meshing.

DETAILED DESCRIPTION OF THE PREFERRED EMBODIMENT

Figure 1:
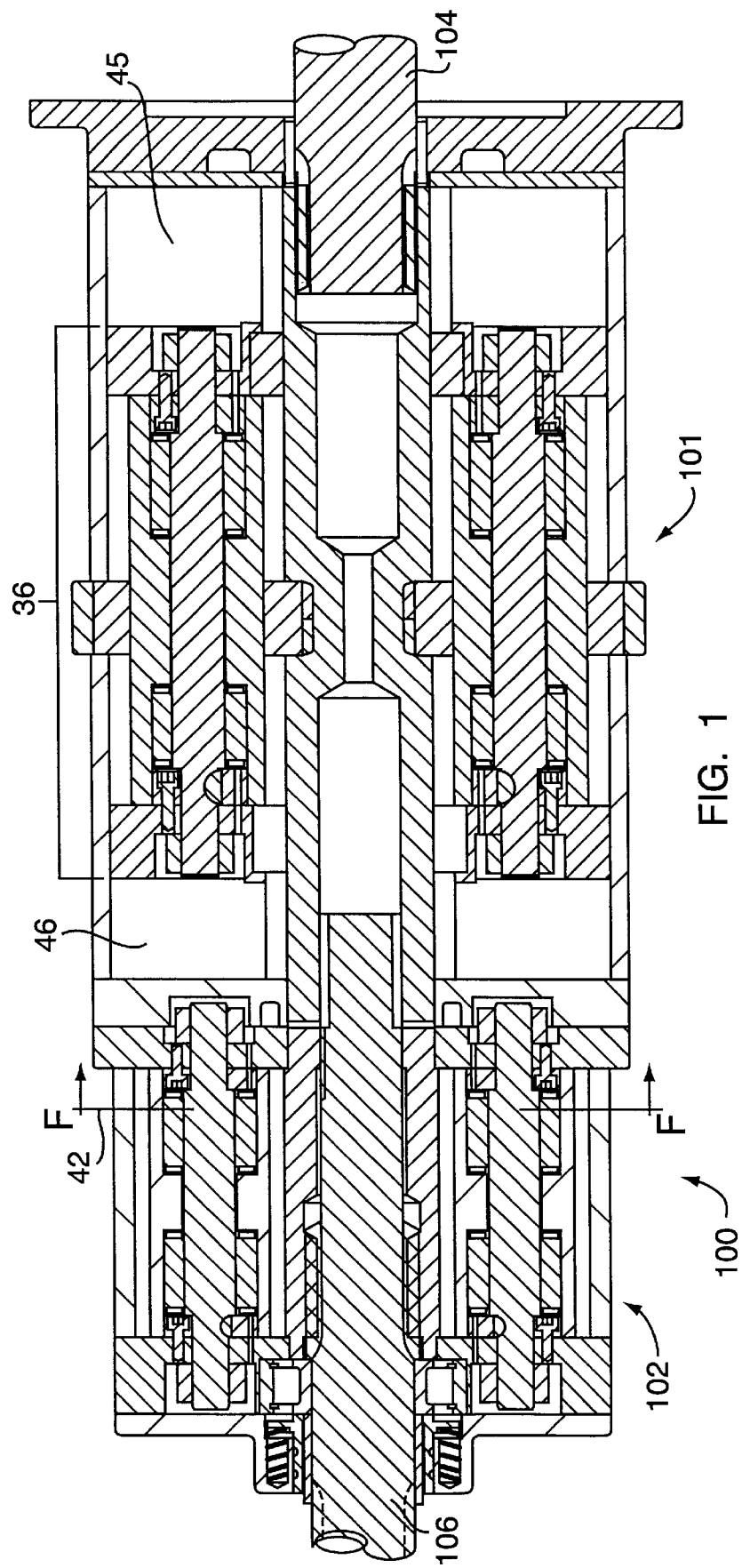
FIG. 1 is top cross sectional schematic view of a preferred embodiment of the step-less hydraulic transmission system of the present invention.
Figure 2:
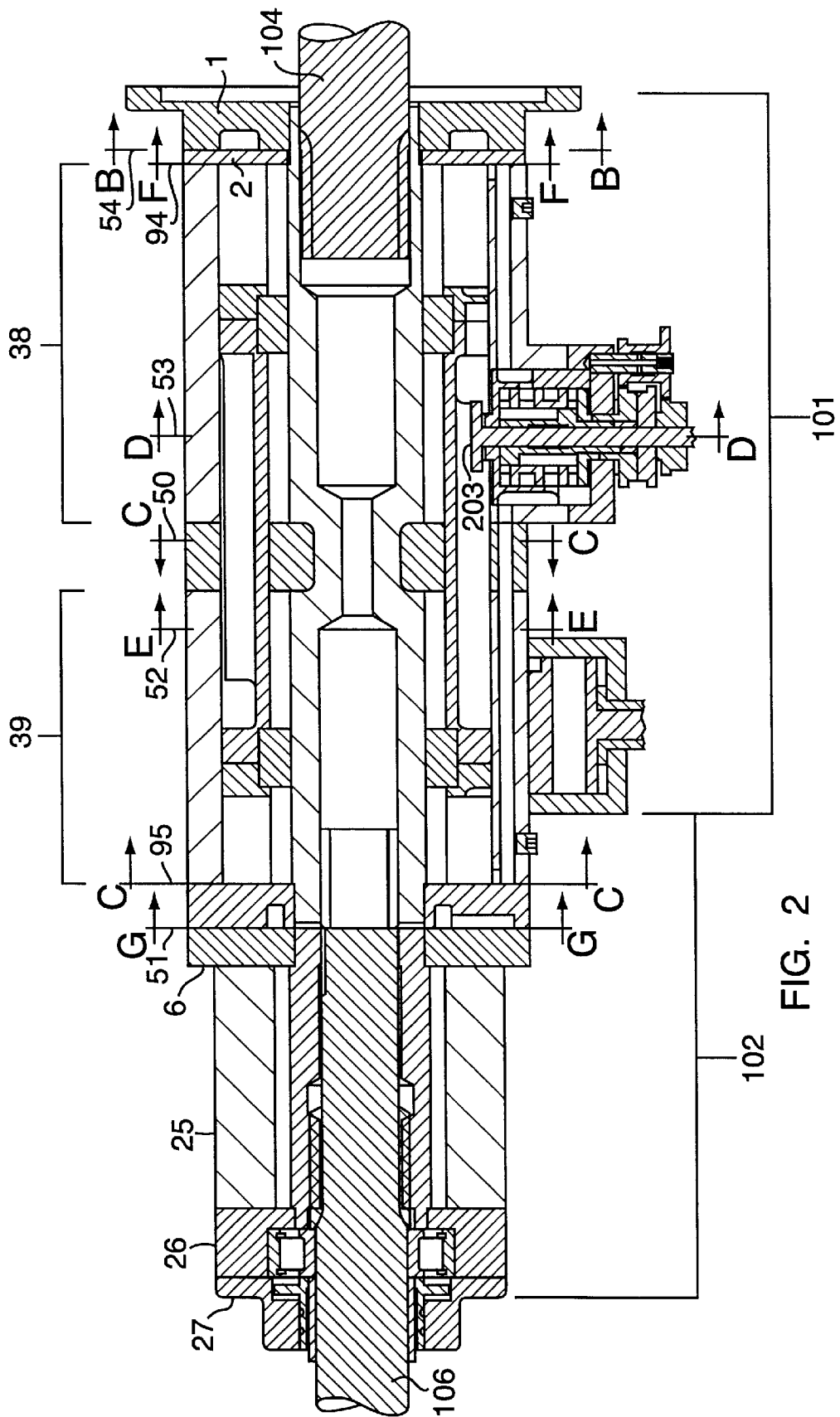
FIG. 2 is a side cross sectional schematic view of a preferred embodiment of the step-less hydraulic transmission system of the present invention.

Top and side cross-sectional views of a preferred embodiment of the present invention are shown in FIGS. 1 and 2, respectively. As shown, the step-less hydraulic power transmission 100 of the present invention includes essentially two gear pumps. The first pump 101 is a reversible and continuously variable gear pump driven by an engine (not shown) through crankshaft 104. Using the known principle that the per revolution output of a gear pump can be made to vary continuously by varying the length of engagement between a gear and an idler, the first pump 101, varies continuously from zero to a maximum to deliver a continuous flow of oil through a closed loop to a second pump 102. The second pump 102 is a non-variable pump that drives output shaft 106. As will be more fully described below, the direction and rate of rotation of the non-variable pump 102 is determined by the direction and volume of oil flow delivered to it by the continuously variable gear pump 101.

Referring still to FIGS. 1 and 2, the continuously variable gear pump 101 includes a forward cavity block 3 and a reverse cavity block 5 divided at the C—C plane 50 (See FIG. 2) by cavity divider 4 which includes two identical partial dividers (not shown), and an idler seal ring 13. (See cross section C—C, 50, FIG. 3.) With end plates 2 and 6, cavity blocks 3 and 5 form a large cavity in which is disposed a main gear 7 and two idler gears 8 shown in cross section E-E, 52, See FIGS. 2 and 6. Referring again to FIG. 1, the engine crankshaft 104 extends through a mounting plate 1 and a forward end 2 plate to engage the main gear 7.

The two idlers 8, form part of an idler assembly 36 that moves axially relative to a main gear 7 responsive to a control apparatus 20 (See FIG. 2). The control apparatus 20, as will be more fully described below and in FIG. 27, controls the axial position of the idler assembly based on engine parameters such as RPM, and brake and accelerator pedal inputs, for example.

As shown in FIG. 1 the idler assembly 36 defines two plenums 45 and 46 within the large cavity, depicted as the A and B plenums, respectively. It can be seen that the A and B plenums vary inversely in size depending on the position of the idler assembly 36 relative to the main gear 7. As the idler assembly 36 moves either to the right or the left the length of engagement of the main gear and idler gears varies, which causes a corresponding change in either or both the direction and per revolution output of the continuously variable gear pump 101. Thus, within the continuously variable gear pump 101 are effectively two pumps, a forward pump 38 and a reverse pump 39. (See FIG. 2.)

Figure 5:
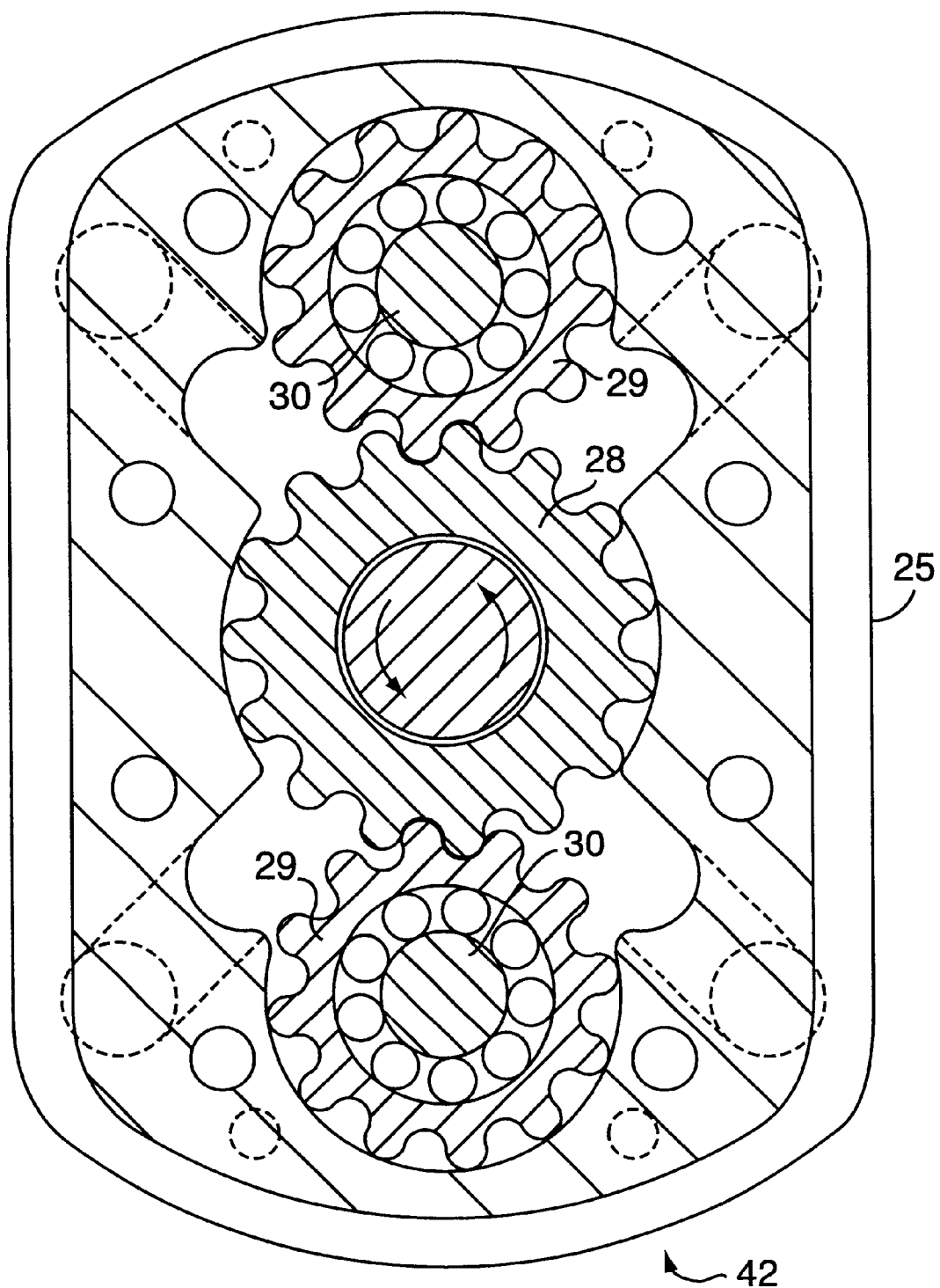
FIG. 5 is a schematic cross sectional view of a preferred embodiment of the present invention at plane F—F shown in FIG. 2.
Figure 18A:
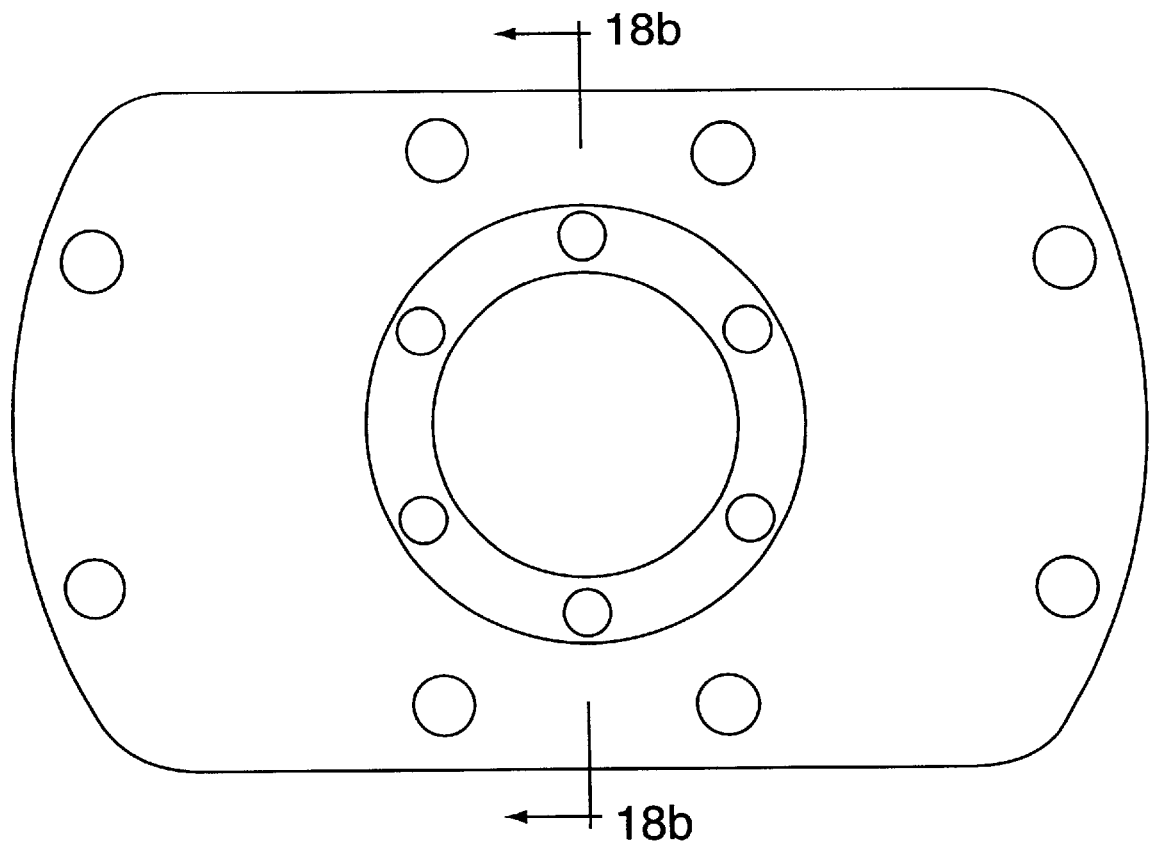
FIGS. 18a–b are schematic views of the non-variable pump cover according to a preferred embodiment of the present invention.
Figure 18B:
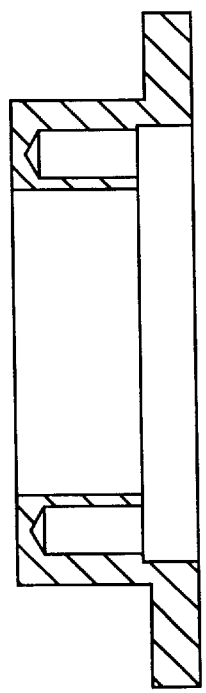

Like the continuously variable gear pump 101, the non-variable gear pump 102 includes a main gear 28 operably engaged with two idler gears 29 mounted on arbors 30, shown in cross-section at the F—F plane 42 in FIG. 5. Referring to FIG. 1, the non-variable gear pump 102 is housed in a cavity block 25 having end plates 24 (shown in detail in FIG. 15) and 26 (shown in detail in FIG. 17). At the output end of the transmission, a Hyatt bearing 32 fits into the end plate 26 to support the output shaft 106 which extends through a cover 27 (shown in detail in FIG. 18) having a seal sleeve 33 and spacer sleeve 34. The output shaft 106 extends through end plates 24 and 6 where it engages the main gear 7 of the continuously variable pump 101.

The idler assembly 36 is detailed in FIGS. 20a–20j. Top and side cross sectional views of the idler assembly, minus the idlers, are shown FIGS. 20a and 20b respectively. In the preferred embodiment the idler assembly includes endplates 14 (FIG. 20c) and 15 (FIG. 20j) into which the main arbors 9 fit through spacer rings 16 as shown. See also FIG. 1. It can be seen that the idler assembly endplates 14 and 15 are shaped to fit within the forward and reverse cavity blocks (FIGS. 8 and 7 respectively). Mounted between endplates 14 and 15 are two transfer slides 18 and 19, shown in side and end partial views in FIGS. 20g and 20h, respectively. Each transfer slide 18 and 19 has a channel 40 disposed therethrough and a gate 47 at each end of the channel 40. The gates 47 open the channel 40 to the four small oil filled areas 48 between the main gear 7 and the idlers 8, shown, for example, at the D—D cross-section 53 in FIG. 4. Gates 47 adjacent to idler assembly plate 15 are open to the outlets of reverse pump 39, and gates 47 adjacent to idler assembly plate 14 are open to and allow oil to flow from the reverse pump 39 to the inlets of the forward pump 38. The function of the transfer slides 18 and 19 is to allow oil to flow from the outputs of the forward pump 38 to the input of the reverse pump 39 and vice versa. As will be described more fully below with reference to FIGS. 34a–d, the direction, (or polarity), and volume of oil flow to the non-variable pump 102 depends on the net output of the forward and reverse pumps 38 and 39 in the continuously variable pump 101.

Figure 4:
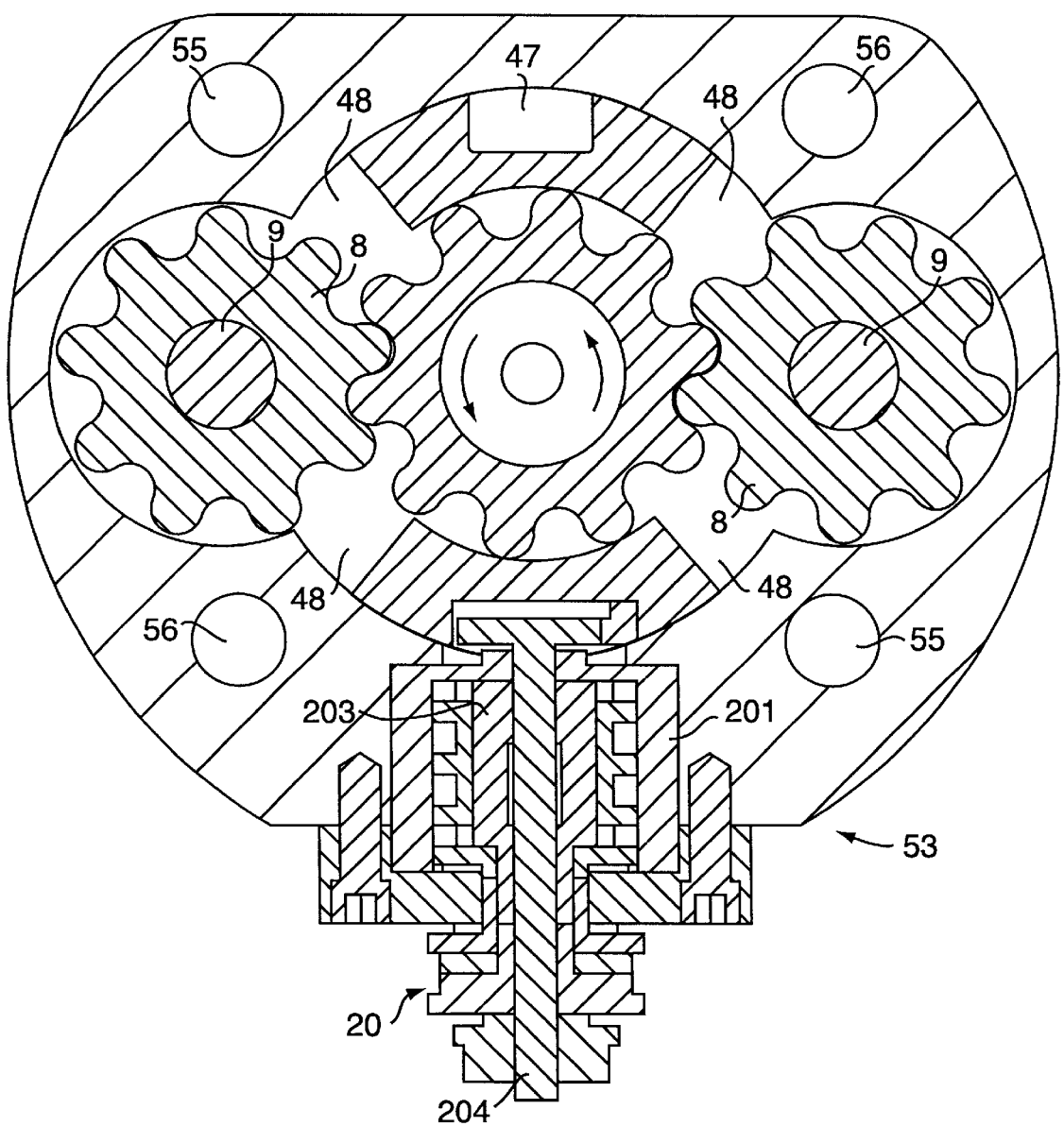
FIG. 4 is a schematic cross sectional view of a preferred embodiment of the present invention at plane D—D shown in FIG. 2.
Figure 20E:
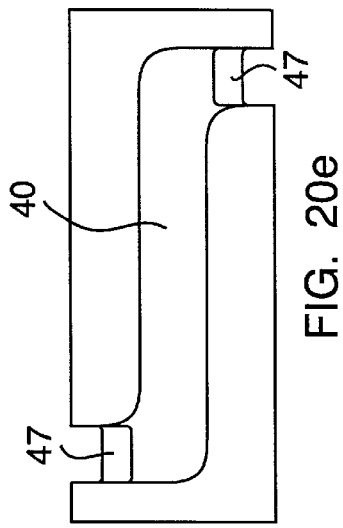
Figure 20I:
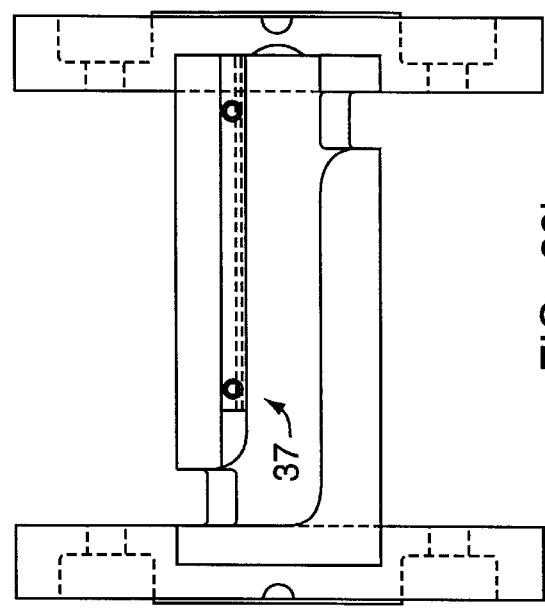
Figure 20B:
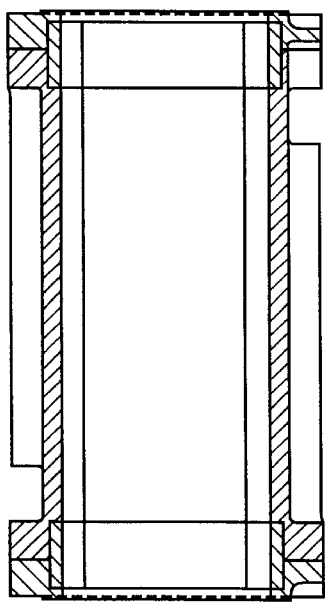
Figure 20A:
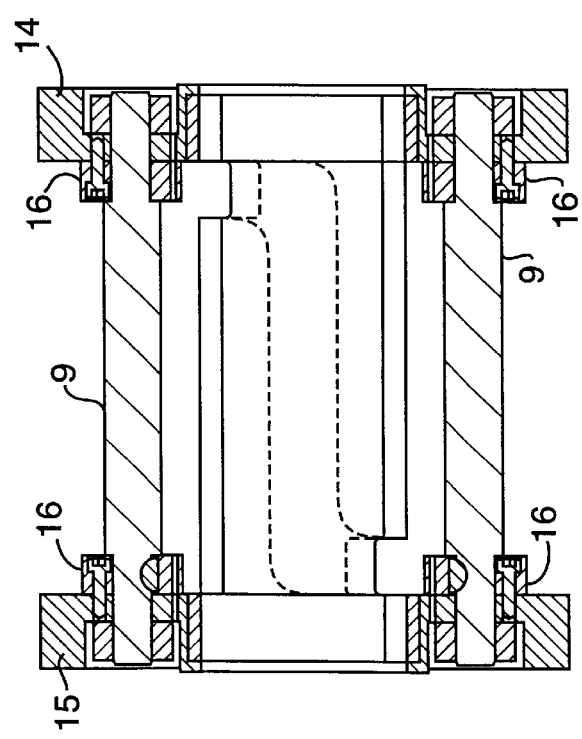

As shown in FIG. 20i, and in FIG. 4, mounted to transfer slide 19 is a rack 37 which meshes with a rack driven gear 204 in the control apparatus 20 (See FIG. 4) to provide idler assembly 36 position feedback.

Referring to FIGS. 8 and 7, within the forward and reverse cavity blocks, 3 and 5 are two sets of passages, 55 and 56, preferably with 9/16 inch diameter bores, through which oil flows in a closed loop from the continuously variable pump 101 to the non-variable pump 102. Passages 55 and 56 are shown in cross section at the D—D plane 53 in FIG. 4 where they are labeled the A and B passages respectively. When the system is in the forward mode, (i.e., when the length of engagement of the idler gears 8 and the main gear 7 is greater in the forward pump 38 than in the reverse pump 39) oil in the A passages 55 have a positive polarity and the oil in the B passages 56 have a negative polarity. See FIG. 4.

Figure 3:
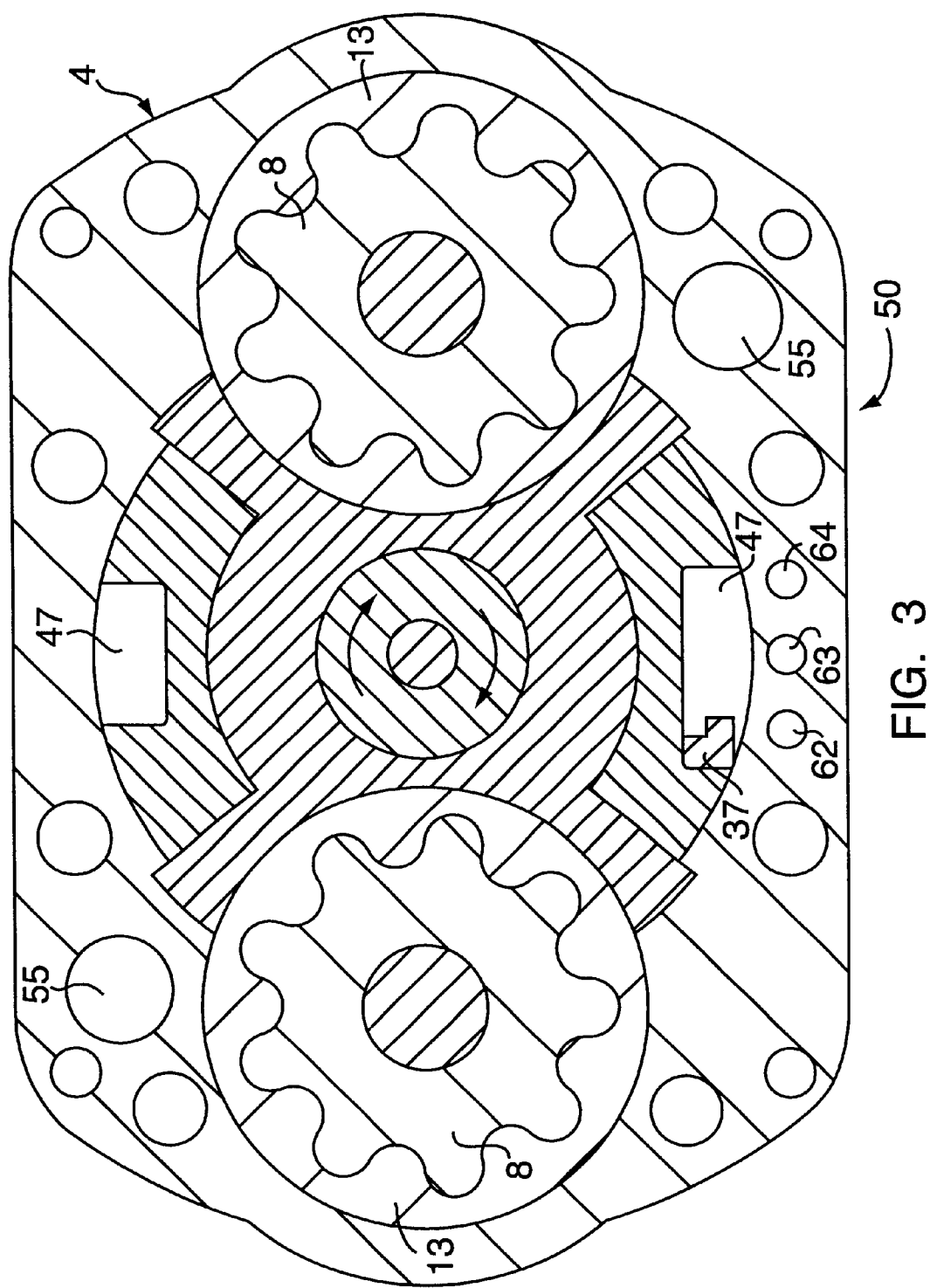
FIG. 3 is a schematic cross sectional view of a preferred embodiment of the present invention at plane C—C shown in FIG. 2.

Referring to FIG. 2, in the reverse pump 39 the A and B passages run from the G—G plane 51 through the reverse end plate 6 (See FIG. 4) and the reverse cavity block 5 (See FIG. 7) to the E—E plane 52. From the E—E plane 52 to the D—D plane 53, only the set of A passages 55 go through cavity divider 4 as shown at the C—C cross section 50 (FIG. 3). Referring again to FIG. 2, from the D—D plane 53 forward, both A and B passages, 55 and 56, go through the full length of the forward cavity block 3 (See FIG. 8) through the forward end plate 2 (See FIG. 9) to the B—B plane 54 into mounting plate 1 (See FIG. 11).

Figure 11A:
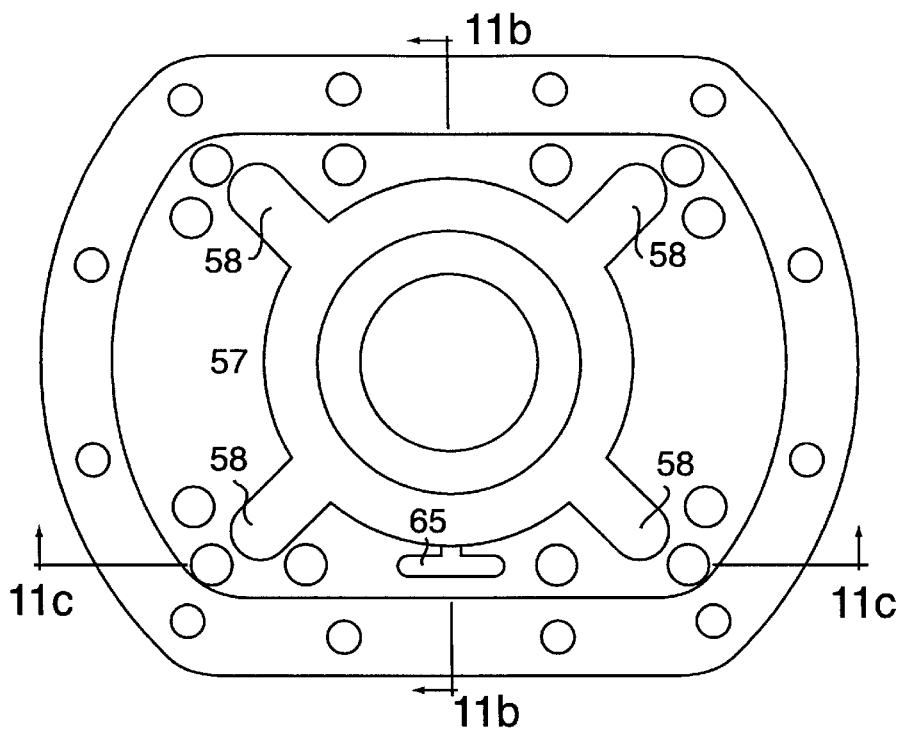
FIG. 11 is a schematic view of the mounting plate of a preferred embodiment of the present invention.
Figure 11B:
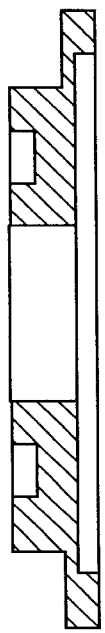
Figure 11C:
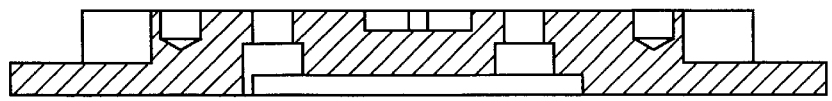

Referring to FIG. 11, cut into mounting plate 1 is a large, preferably one quarter inch deep, ring 57 connected to both the A and B passages, 55 and 56, by four equally deep channels 58. Referring to FIG. 14, a similar ring 59 is cut into the reverse end plate 6 but, as shown, in the reverse end plate 6 only the B passages 56 are connected to the ring 59 through channels 60. The polarity of oil pressure is always opposite in the two rings 57 and 59. When the system is in the forward mode, the polarity is positive in mounting plate ring 57 and negative in reverse end plate ring 59.

Figure 33:
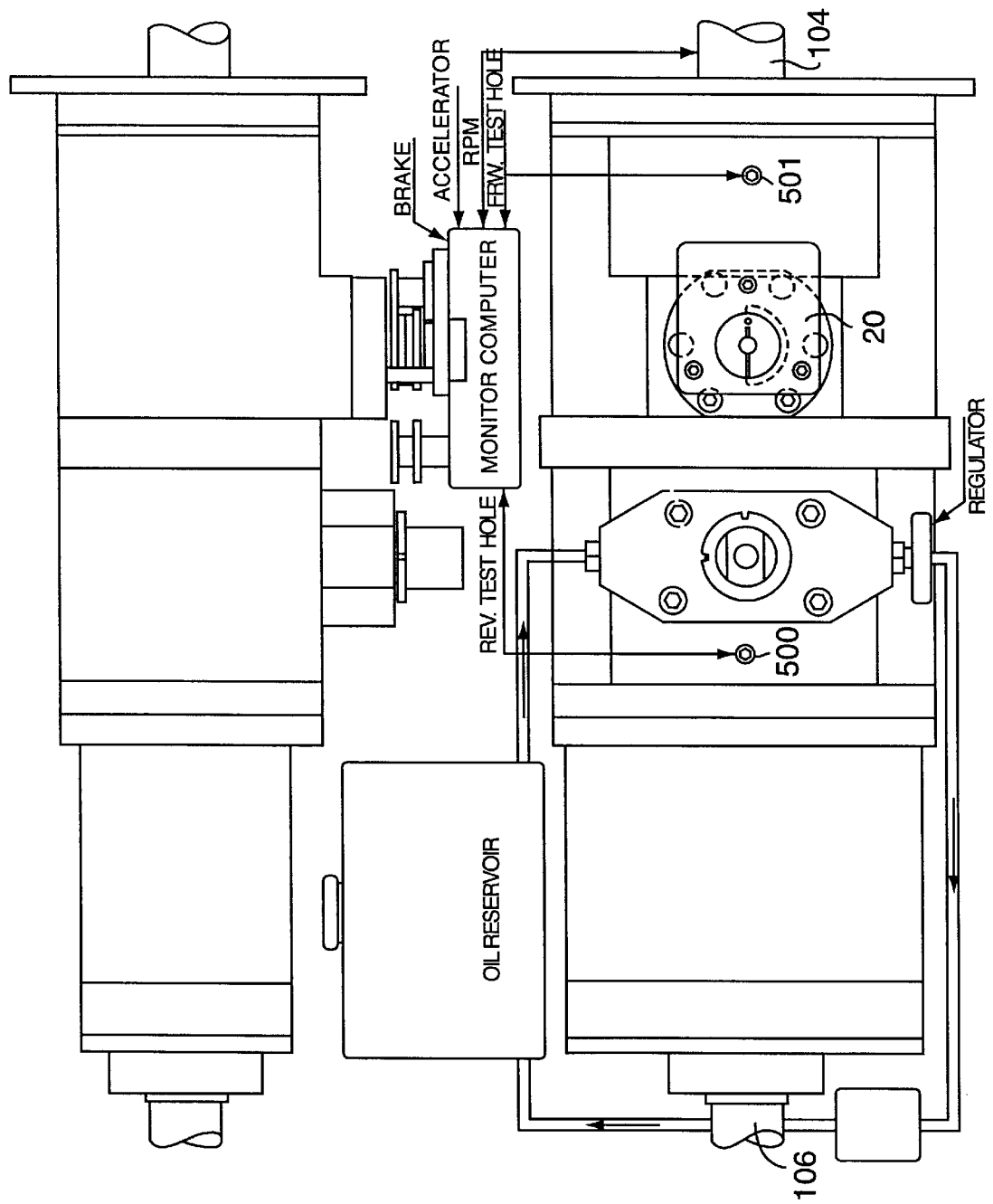
FIG. 33 is a schematic overview of the step-less hydraulic transmission system according to the present invention.
Figure 35C:
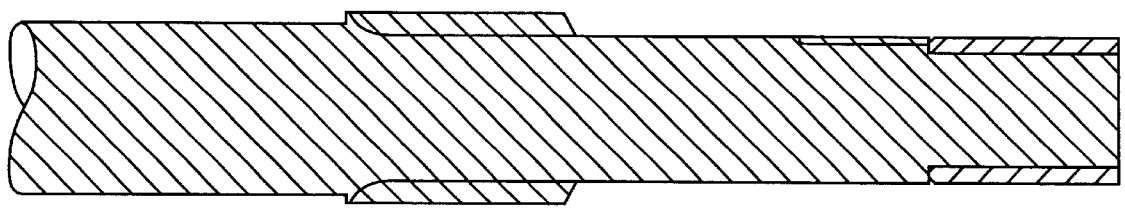
FIGS. 35 is a schematic view of an assembling fixture for the present invention.
Figure 35D:
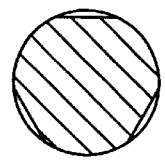
Figure 35A:
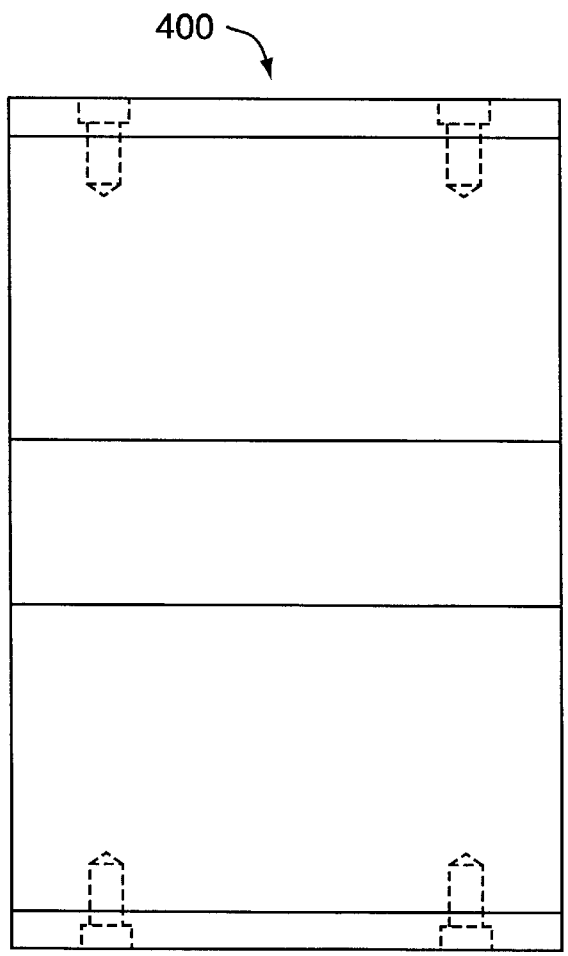
Figure 35B:
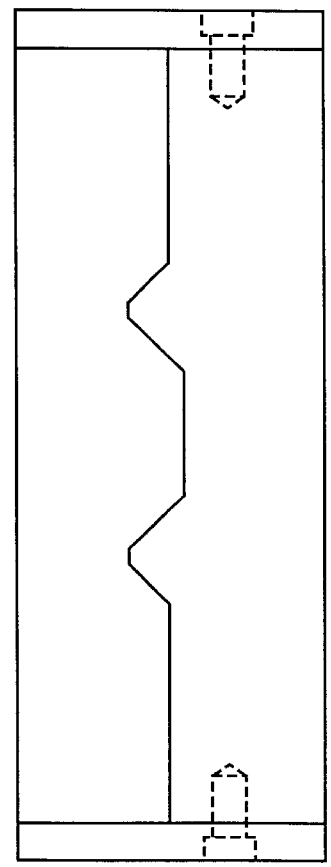

Referring to FIG. 33, in the preferred embodiment, the forward and reverse cavity blocks have test holes 500 and 501 with removable plugs are so that any air trapped in the A and B plenums can be excluded prior to initial operation.

The Power Circuit

Referring to FIGS. 1 and 2, and the indicated cross sections, the closed loop flow of oil in the power circuit, is described starting at the E—E plane 52 (FIG. 6) where oil from the non-variable pump 102 enters the "B" passages 56 of the reverse cavity block 5 and mixes with the oil from the outlet of the reverse pump 39 where it enters the transfer slides, 18 and 19 through gates 47. As noted above, the slides gates 47 nearer idler assembly plate 15 are always open to the outlets of the reverse pump 39 and slide gates 47 nearer idler assembly plate 14 are always open to the inlets of the forward pump. There are only two ports in the "D" plane face of forward cavity block 3 (See FIG. 8). From these two ports, the oil enters the "B" passages 56 of forward cavity block 3 and flows to the mounting plate 1 into the ¼ inch deep ring 57 (see FIG. 11) where "A" and "B" passages 55 and 56 are connected via channels 58.

Still referring to FIGS. 1, 2, and 11 all the oil flowing into mounting plate 1 (FIG. 11) from the "B" passages 56 flows through the "A" passages 55 to the non-varying pump 102. At the E—E plane 52 however (See FIGS. 2 and 6), there are ports for both sets of A and B passages 55 and 56 of the reverse cavity block 5. Depending on the position of the idler assembly, part of the oil from the "A" passages 55 in the forward cavity block 3 will flow through the reverse cavity block 5 ports and enter the inlets of the reverse pump 39. The remainder of the oil coming from the forward cavity block 3 "A" passages 55 will flow through the reverse cavity block 5 into the non-variable pump 102, causing it to rotate. From the non-variable pump 102 the oil flows back to the continuously variable pump 101 through the "B" passages of the reverse cavity block 5 to the E—E plane 52, thus completing the loop.

Figure 6:
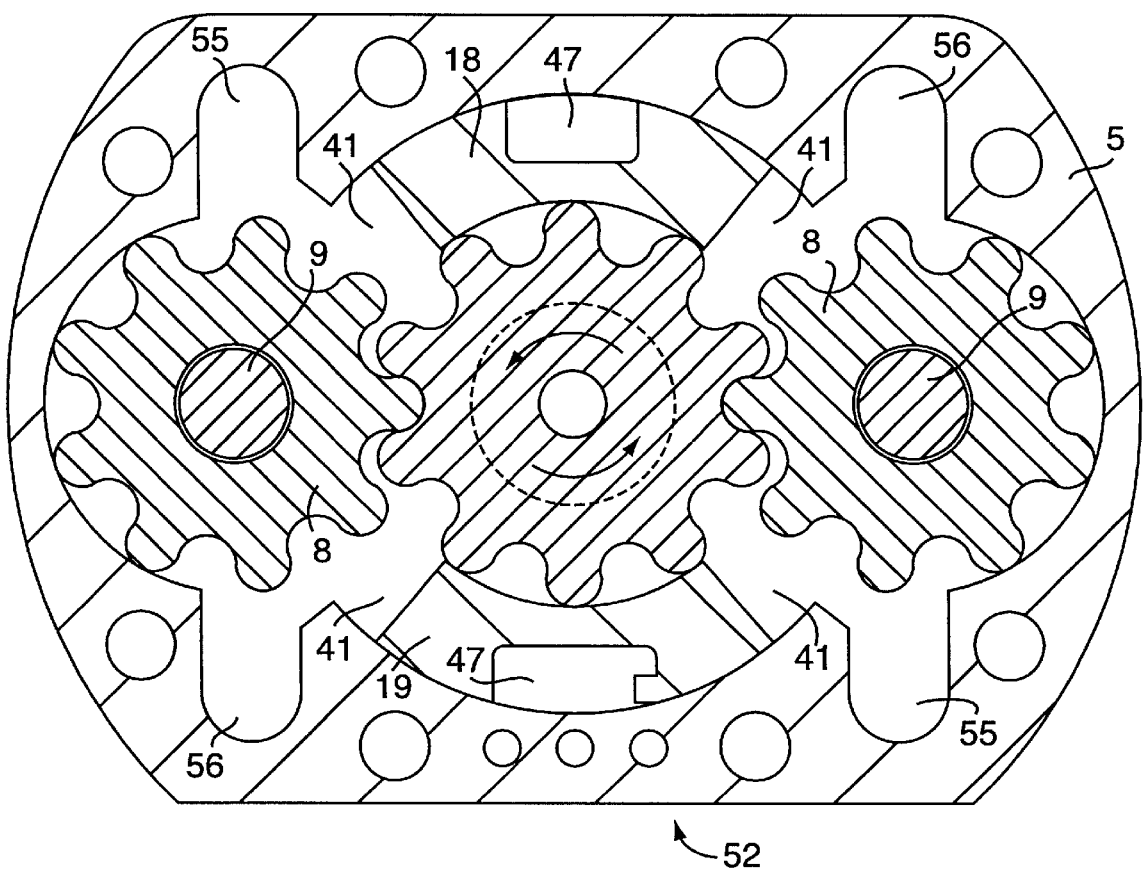
FIG. 6 is a schematic cross sectional view of a preferred embodiment of the present invention at plane E—E shown in FIG. 2.
Figure 7A:
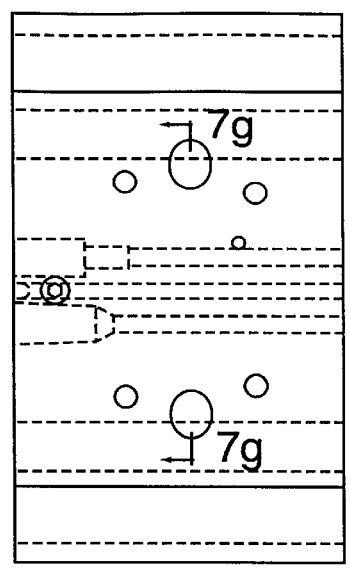
FIGS. 7a–g are schematic views of the reverse cavity block of a preferred embodiment of the present invention.
Figure 7B:
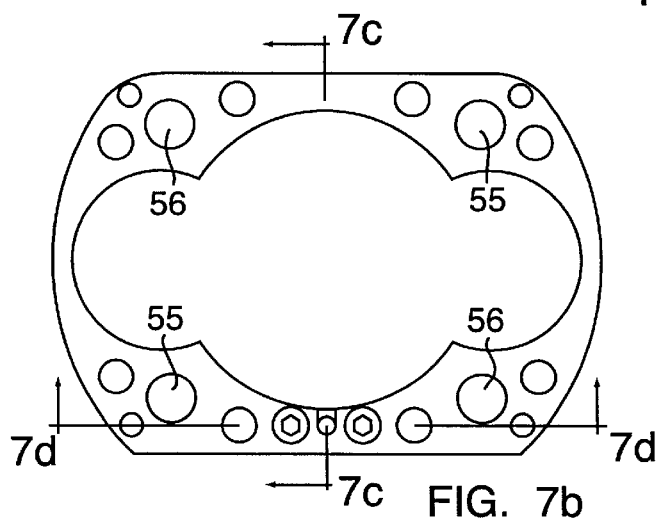
Figure 7G:
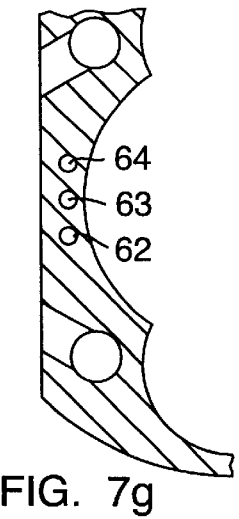
Figure 7C:
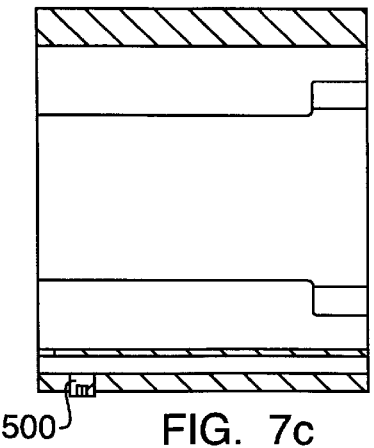
Figure 7D:
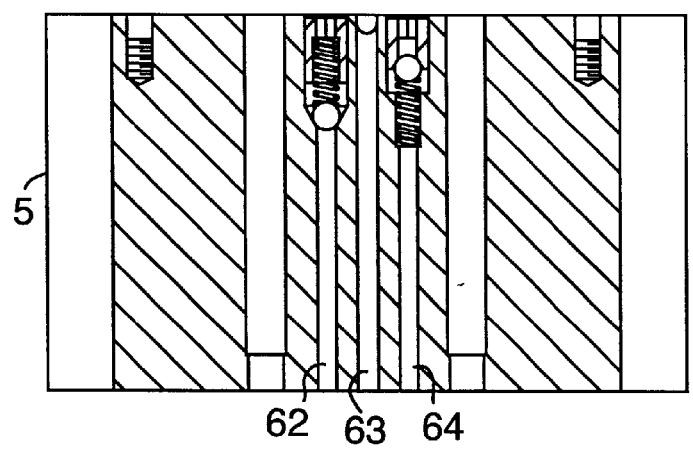
Figure 7E:
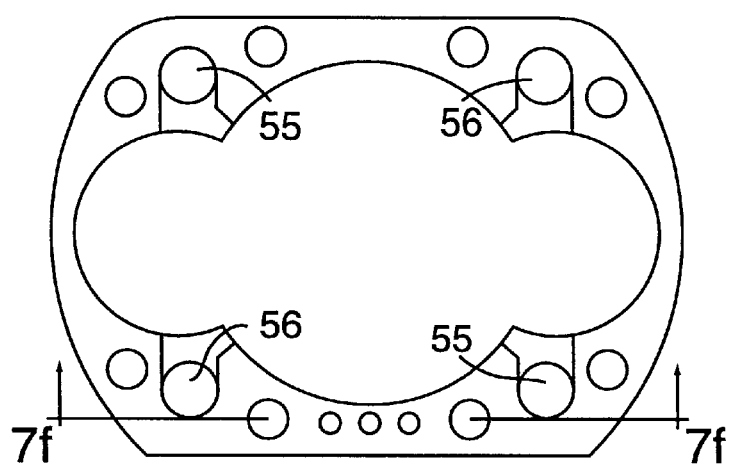
Figure 7F:
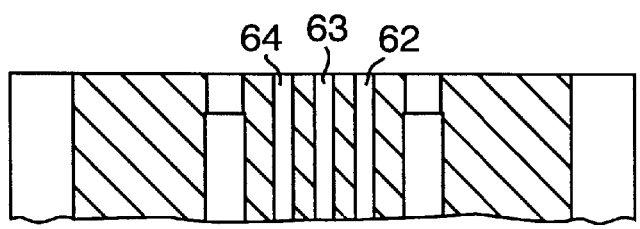

Referring to FIG. 6, at the E—E plane 52, the oil entering from the "B" passages 56 of reverse cavity block 5 mixes with the oil from the outlets 41 of the reverse pump 39 and that which is sucked in by the forward pump through the gates 47 of transfer slides 18 and 19.

The Gears

It is an important aspect of the present invention that the gear tooth shape is such that, at any point along the axial length of the gear, there is only one point of contact between the central gear and the idler gear. This effectively eliminates the troublesome formation of pockets between gears. In the preferred embodiment the formula for tooth shape for all gears is simply that the chordal addendum is a pure radius. As understood by those skilled in the art the dedendum can be determined by the addendum of the gear in contact with it. Gears such as spur gears, with teeth cut parallel to the gear axis, will not have only one point of contact along the axial length of the gears and therefore are unsuitable. In the preferred embodiment of the present invention, gear teeth are cut helically and have an axial length at least one full tooth length so that the gears have a pitch diameter contact somewhere along the axis at all times.

FIGS. 21–24 and their associated views show details of main and idler gears for the continuously variable 101 and the non-variable pumps 102. Referring to FIG. 24, main gear 7 is shown with cross sectional views at the A—A plane (FIGS. 24f and 24d), B—B plane (FIG. 24e), and C—C plane (FIG. 24c). As shown in FIG. 24a the main gear 7 is preferably a right hand gear. The crankshaft 104 is shown in a partial cutaway view of main gear 7 in FIG. 24b.

Figure 22A:
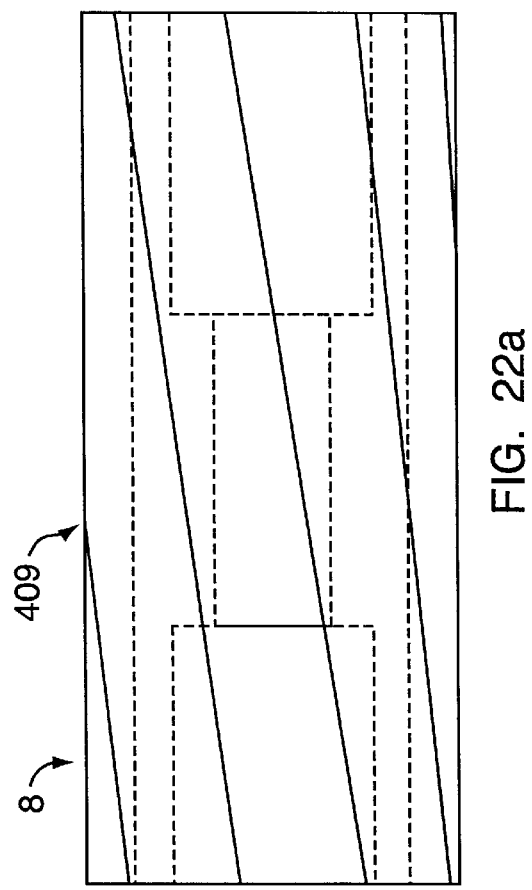
FIGS. 22a–d are schematic views of the main idler gear in the continuously variable pump according to a preferred embodiment of the present invention.
Figure 22B:
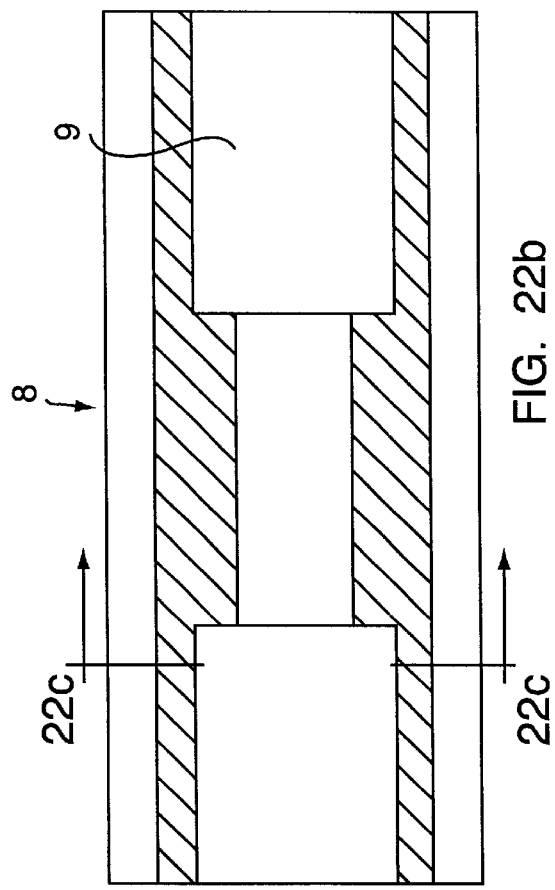
Figure 22C:
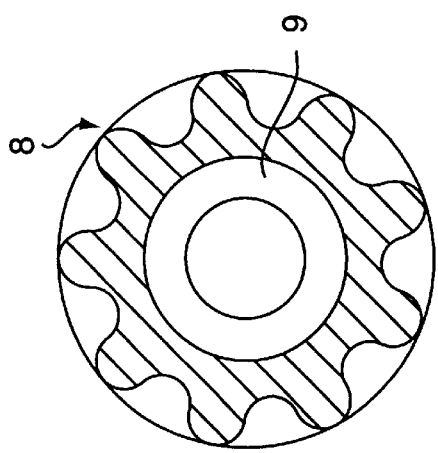
Figure 22D:
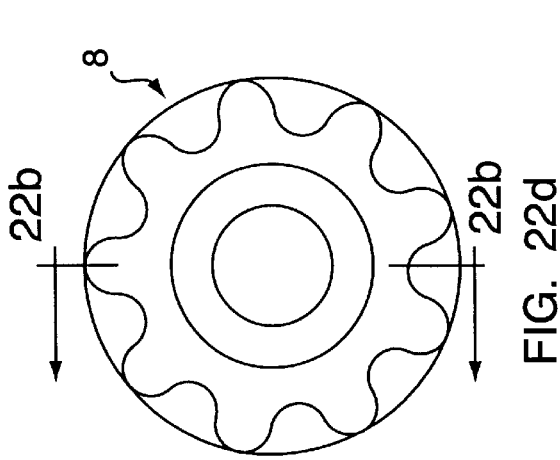

Referring to FIGS. 22a–22d, the main idler gear 8 is shown as a left hand gear in side and end views (FIGS. 22a and 22d respectively). Partial cutaway side and end views of the main idler gear 8 showing the main arbor 9 are shown in FIGS. 11b and 22c respectively.

Figure 23A:
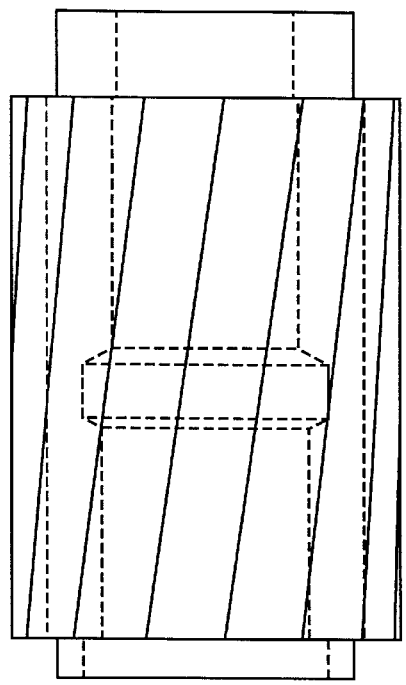
FIGS. 23a–d are schematic views of the driving gear of the non-variable pump according to a preferred embodiment of the present invention.
Figure 23B:
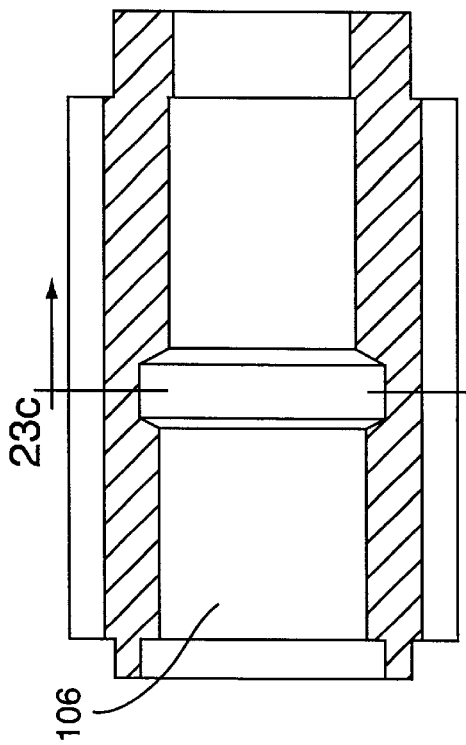
Figure 23C:
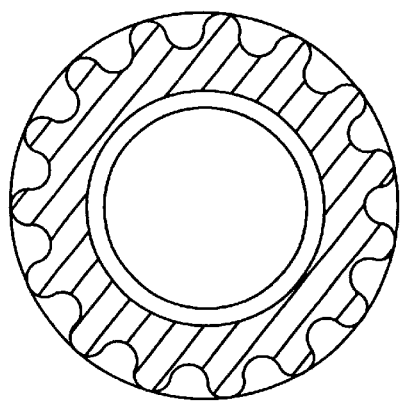
Figure 23D:
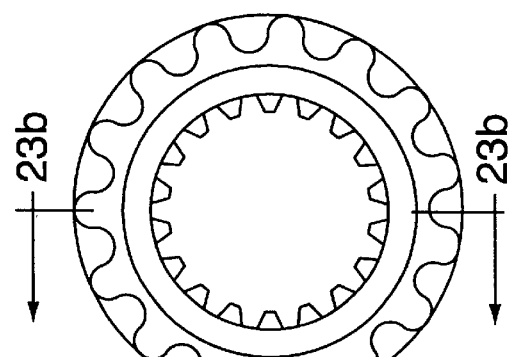
Figure 24D:
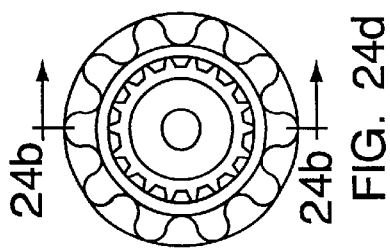
FIGS. 24a–f are schematic views of the main gear in the continuously variable pump according to a preferred embodiment of the present invention.
Figure 24C:
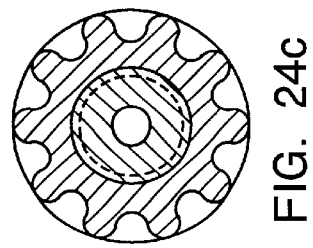
Figure 24B:
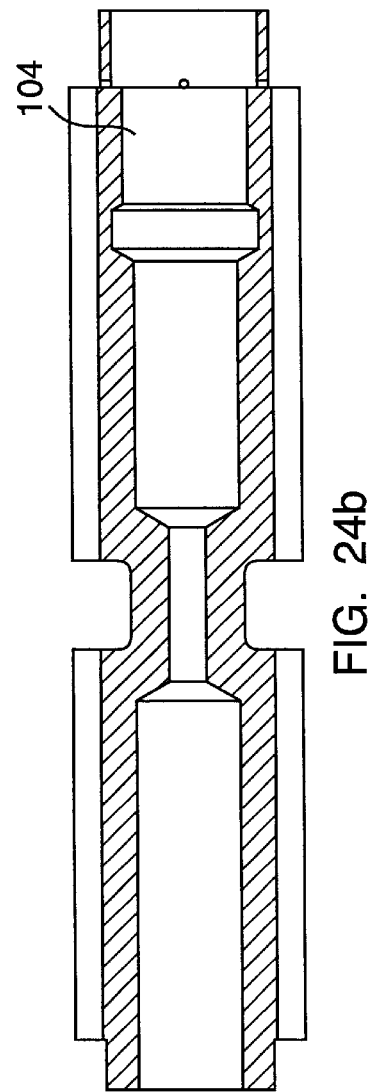
Figure 24A:
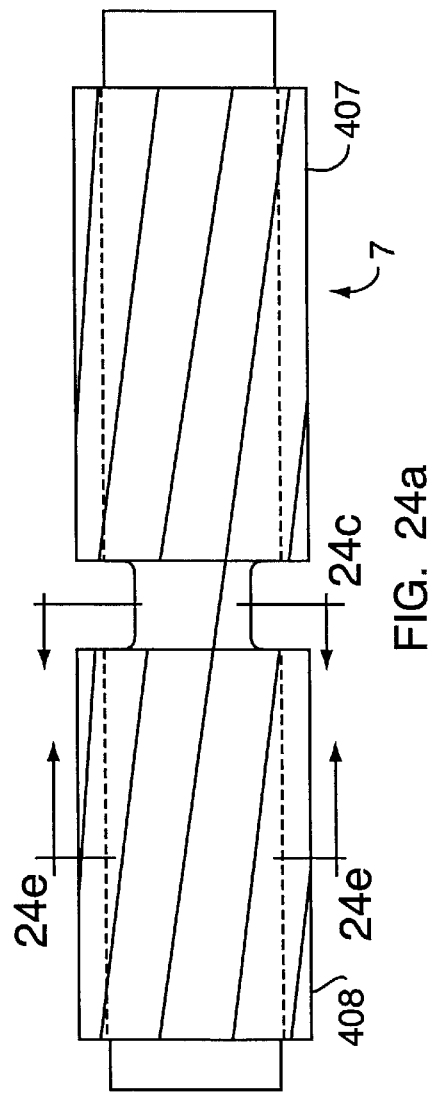
Figure 24F:
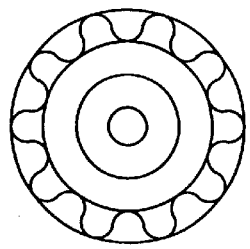
Figure 24E:
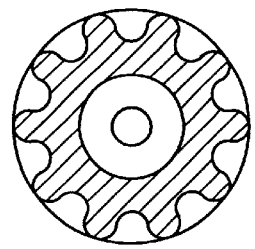
Figure 25A:
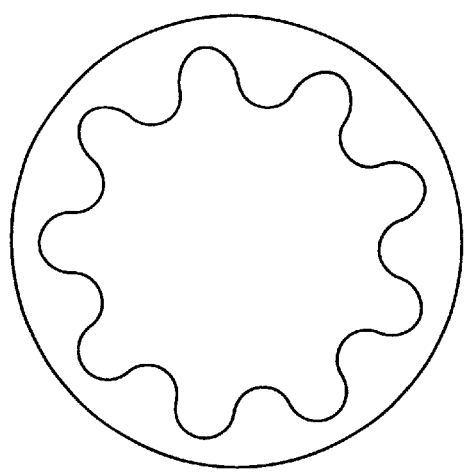
FIGS. 25a–d are schematic views of the seal rings used in the continuously variable pump according to a preferred embodiment of the present invention.
Figure 25B:
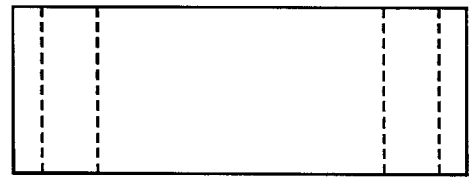
Figure 25C:
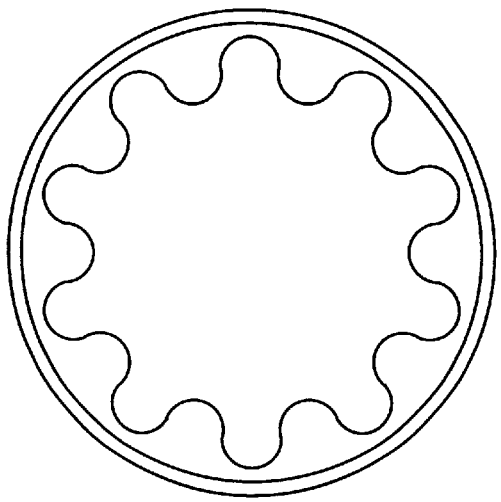
Figure 25D:
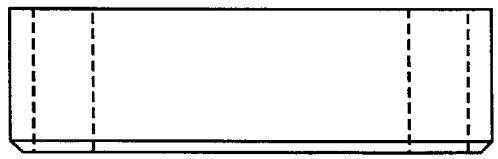

Referring to FIGS. 23a–23d, the driving gear 28 in the non-variable pump 102 is shown in side and end views, (FIGS. 23a and 23c respectively). Output shaft 106 is shown in partial cutaway side and end views (FIGS. 23b and 23d). As shown, the driving gear 28 is preferably a right-handed gear.

Figure 21C:
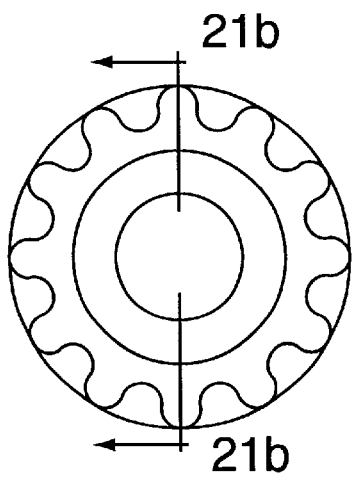
FIGS. 21a–d are schematic views of the non-variable idler gear according to a preferred embodiment of the present invention.
Figure 21B:
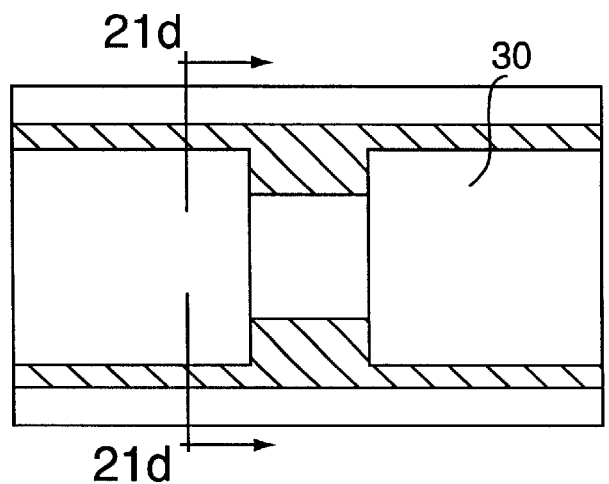
Figure 21D:
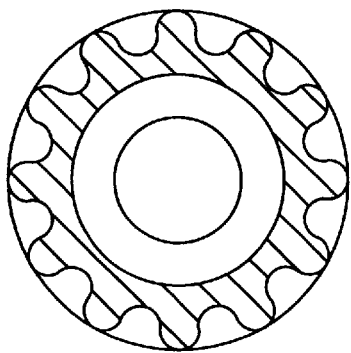
Figure 21A:
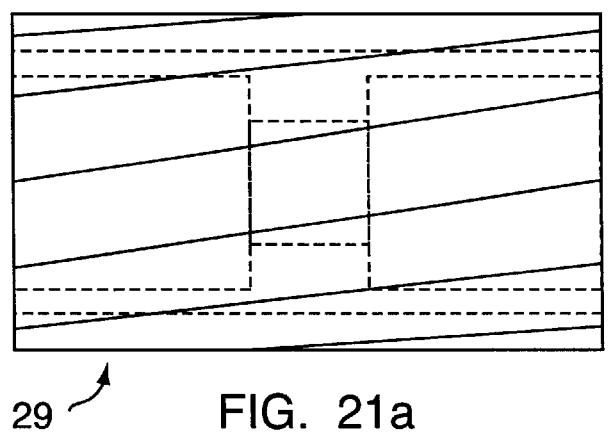

Referring to FIGS. 21a–21d, the idler gear 29 in the non-variable pump 102 is shown in side and end views (FIGS. 21a and 21d, respectively). Partial cutaway side and end views (FIGS. 21b and 21c) show the arbor 30.

Figure 26A:
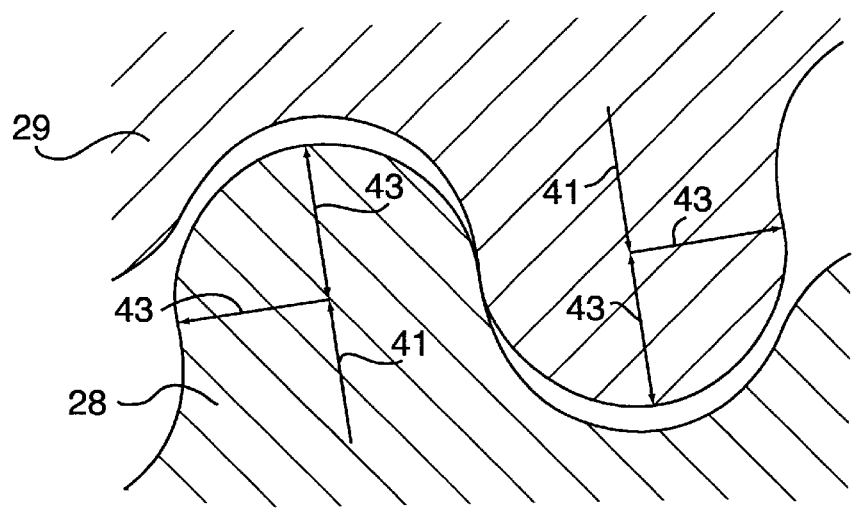
FIGS. 26a–b are schematic illustrations of the gear teeth used in a preferred embodiment of the present invention.
Figure 26B:
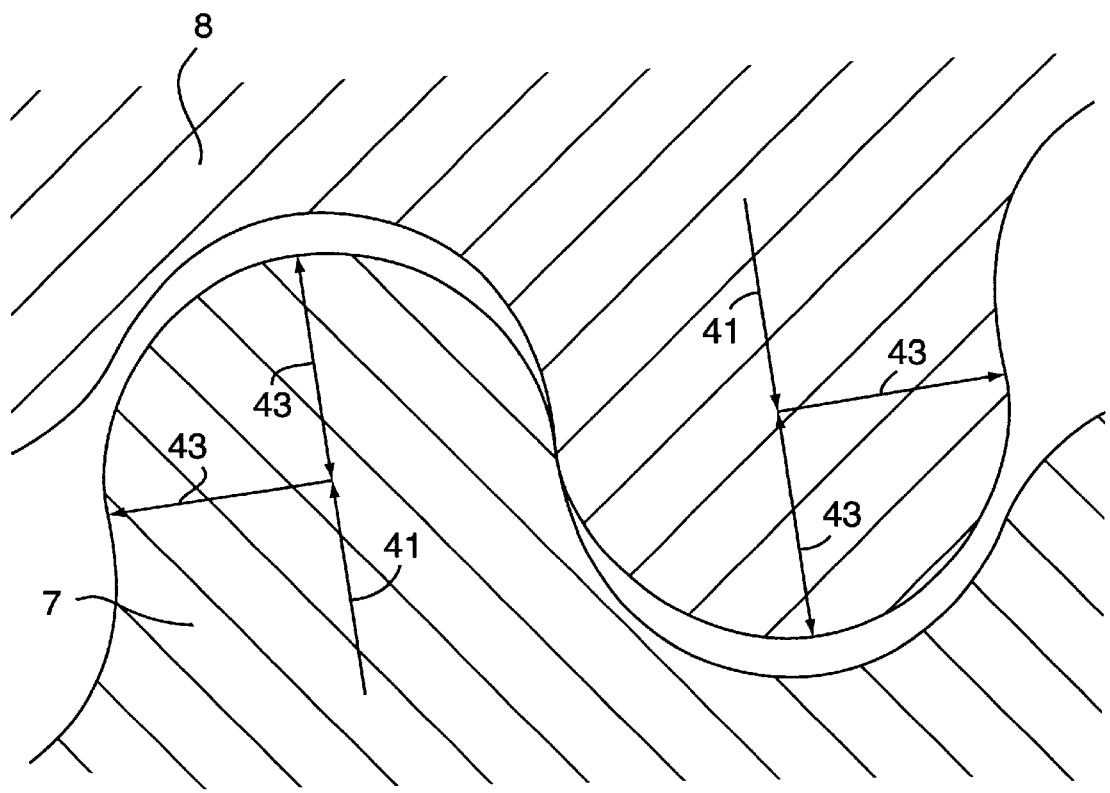

Referring to FIGS. 26a and 26b, a ten to one sketch of the main 7 and idler 8 gears of the continuously variable pump 101 FIG. (26b) and the driving gear 28 and idler gear 29 of the non-variable pump 102 (FIG. 26a) are shown at three different points of rotation. Referring to FIG. 26b, the pitch diameters P.D., of main gear 7 and idler gear 8 are given as 2.000 and 1.800 inches respectively. Using the common formula to determine chord length, $c=2R \sin \theta/2$ where c is the length of the chord of an arc subtended by angle $\theta$, and R is the radius of the pitch circle, the chordal addendum, 43, defined as half the chord length, (c/2) can be calculated for each gear. Thus, for example, for the main gear 7 of the continuously variable pump, with given pitch diameter of 2.000 (R=1.000) and θ/2=9°, c/2=R sin θ/2=0.1564. Likewise, for idler gear 8 with given pitch diameter of 1.800, (R=0.900) and θ/2=10°, c/2=R sin θ/2=0.1563.

The circular pitch, defined as the distance between corresponding points on adjacent teeth measured as an arc along the pitch circle, may be derived using the common formula for arc length s=RΩ, where Ω is the angle subtended by the arc in radians. Referring still to FIG. 26*b*, for the main gear 7 with given pitch diameter of 2.000 (R=1.000) and Ω=36° or 0.6283 radians, circular pitch=s=RΩ=0.6283. Likewise, the circular pitch of the idler 8 gear is calculated from given pitch diameter, P.D.=1.800 (R=0.900), Ω=40°=0.6981 radians, circular pitch=s=RΩ=0.6238.

Still referring to FIG. 26*b*, the radius, r, 41, is also shown for each gear. Radius r may be calculated using the common formula r=R cos θ/2. Using the given values of pitch diameter P.D.=2.000 (R=1.000) and θ/2=9°, r is calculated for the main gear 7 as r=R cos θ/2=0.98768. Likewise, for idler gear 8 with given pitch diameter, P.D.=1.800 (R=0.900) and θ/2=10°, r=R cos θ/2 =0.8863.

Referring to FIG. 26*a*, similar calculations can be made for the drive gear 28 and idler 29 in the non-variable pump 102.

Because the gears 7, and 8, are helical, whenever some torque is present on the main shaft 104 there is a corresponding axial force on each idler and consequently on the whole idler assembly. The magnitude of the axial force depends on the helical angle ψ of the teeth at pitch diameter. In the example illustrated in FIGS. 26*a* and 26*b*, the helix angle ψ for all gears is 8°. Therefore, if a torque of 200 ft-lbs. (2400 in-lbs) is present on the shaft 104, and the main gear 7 has a pitch diameter of 2.000 inches, (so that the radius of the pitch circle is 1.000 inch) a tangential force $F_t$ of 1200 lbs. is exerted on each idler at the pitch diameter pressure point. From one idler gear the axial force, is calculated from the formula:

$$F_a = F_t \tan \psi$$

In this example $F_a$=1200 tan 8°=168.649. The combination of axial forces from both idler gears will therefore produce an axial force on the idler assembly of 337.3 lbs. Given a cross sectional area of approximately 13.5 square inches for A and B plenums 45 and 46, the resulting pressure will be about 25 lbs. per square inch.

In the preferred embodiment of the present invention with two idler gears, whenever torque is present on the central gear, radial forces acting on the central gear by the idlers cancel out thus eliminating the need for special bearings for the central gear.

Clearances and Idler Assembly Travel

It is another important aspect of the present invention that except for losses due to small necessary clearances in both forward and reverse pumps, 38 and 39, the output, or "per revolution" volume of oil delivered is always directly proportional to engine RPMs. In the present invention clearances are preferably only one to two thousandths of an inch per side, i.e., for one driving gear and one idler. The resulting losses are insignificant compared to the volume of oil displaced through the gaps between the teeth of the gears and are not included in the output figures given below.

Referring to FIG. 4, the amount of oil displaced in each pump revolution is that which fills the gaps 48 between the teeth of central gear and idlers and goes past their meshing parts as the gears rotate.

The per revolution volume displacement for one driving gear and one idler, or one side, is calculated as the net area of gear tooth, a, times the axial length of engagement of the gear. Since the central gear drives two idlers, the total volume displacement amounts to twice that for one side.

For the non-variable pump, 102, the net area, a, of gear teeth is preferably 2.472 square inches. The axial length of engagement is preferably 3.125 inches, giving the maximum per revolution volume of oil displaced in the non-variable pump as 7.726 cubic inches.

For the continuously variable pump 101, the net area, a, of gear teeth is preferably 3.616 square inches. As noted above, responsive to control apparatus 20, the idler assembly 36 moves axially along an axis parallel to the crankshaft 104 so that the length of engagement between the idlers and the main gears vary inversely in the forward and reverse pumps 38 and 39. FIGS. 34*a–c* illustrate the idler assembly at maximum forward, neutral and reverse positions respectively.

In FIG. 34*a*, the axial length of engagement of the gears in the forward pump $l_1$ is at its maximum of 3.75 inches, giving a per revolution volume, (v=a×$l_1$) of 13.558 cubic inches. But when $l_1$ is at its maximum length, the axial length of engagement of the gears of the reverse pump 12, is at its minimum length of ¼-inch. This, in effect, reduces the axial length of engagement of the forward pump by ¼ inch to 3.5 inches, for a "per revolution" total volume of 12.655 cubic inches maximum. At the maximum forward position shown in FIG. 34*a*, the idler assembly plate 14 contacts the forward end plate 2 reducing the A plenum 45 to substantially zero and increasing the B plenum 46 to its maximum. In this position the non-variable pump 102 is running forward at maximum speed based on engine RPM.

For the maximum forward setting, if the continuously variable pump 101 displaces 12.655 cu in. per revolution, and the non-variable pump 102 displaces 7.726 cu in. per revolution, the non-variable pump 102 will make 1.638 revolutions for each revolution of the continuously variable pump 101. In other words the input to output shaft ratio is 1.638 to 1.000 (or 12.655 cu. in./7.726 cu in.)

In FIG. 34*c*, the idler assembly 36 is at its maximum reverse setting. In this position 12, is at its maximum axial length of engagement of 2.937 inches and $l_1$ is at its minimum length of 1.062 inches. For area, a, equal to 3.616 square inches, the maximum per revolution volume of oil displaced by the reverse pump is 10.621 cubic inches. Subtracting the volume of oil displaced by the forward pump (1.062 inches×3.616 sq. inches=3.8402 cu. in.), the net volume of oil displaced by the reverse pump 39 at its maximum axial length of engagement is 6.780 cubic inches. Given the maximum non-variable pump 102 displacement of 7.726 cubic inches, at maximum reverse, it can be seen that at maximum reverse, the crankshaft 104 runs faster than the output shaft 106. The actual ratio is 0.877 to 1 (or 6.780 cu in./7.726 cu in.)

In FIG. 34*b*, the idler assembly 36 is in its neutral position where $l_1$=$l_2$=2.000 inches giving an output of 7.232 cubic inches from each pump. Since the output of one pump is fed into the input of the other, the 'per revolution' displacement of forward and reverse pumps cancel out and the net output is zero.

From the neutral position, in the preferred embodiment of the present invention, the maximum length of travel of the idler assembly in the forward direction, $w_1$, is 1 ¾ inches and the maximum length of travel in the reverse direction, $w_2$, is 15/16 inch giving a maximum travel of 2 11/16 inches. As indicated, forward and reverse cavity blocks, 3 and 5, have different axial lengths, i.e., the forward pump is longer than the reverse pump. This results in different lengths of travel for the idler assembly 36 from the neutral, or central point, to either limit.

In FIG. 34d, the idler assembly 36 is positioned where the per revolution displacement of the continuously variable pump 101 equals that of the non-variable pump 102 (7.726 cu in. in this example). At this position, the input to output shaft ratio is 1 to 1, equivalent to direct drive in conventional transmissions.

Oil pressure may be calculated from the area of one side (i.e. for main gear 7 and one idler 8) of the forward pump 38 at maximum axial length of engagement $l_1$ under a given torque of two hundred foot pounds (2400 inch pounds). At that torque, the weight of one inch would be 2400 lbs., or 1200 lbs. per side. Given a depth of tooth of 0.288 inch and maximum $l_1$ of 3.750 inches, the maximum area of gear teeth under pressure is 1.078 square inches. If that area is supporting a weight of 1200 lbs., then the pressure is 1112.9 lbs. per square inch.

The Control Circuit

Figure 32A:
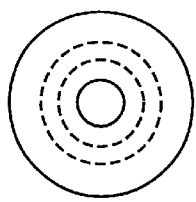
FIGS. 32a–g are schematic views of parts of the control apparatus depicted in FIG. 27.
Figure 32B:
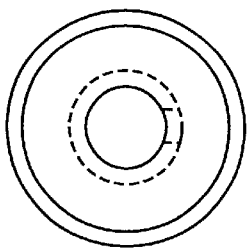
Figure 32C:
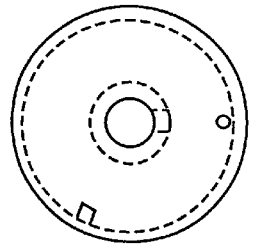
Figures 1, 32A:
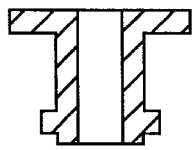
Figures 1, 32B:
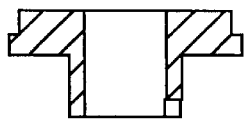
Figures 1, 32C:
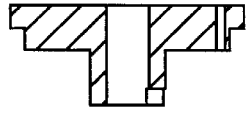

Referring to FIGS. 2 and 27, the function of the control apparatus 20 is to rotate a control valve 204 to let pressurized oil move into either the "A" or "B" plenums thereby forcing the idler assembly 36 to a new position. The control apparatus 20 responds to a command from a computer monitor (not shown) that is programmed to determine most efficient idler position based on input parameters such as engine RPM, accelerator and brake positions, oil pressures and the like. As will be more fully described below, the control apparatus 20 also has gears to provide idler position feedback to the computer monitor. Referring to the Sec. B—B view of forward cavity block 3 in FIG. 8, the control apparatus 20 fits in a ¾ inch diameter opening 69 in the forward cavity block 3 and is mounted to the forward cavity block 3 on mounting posts 213 and 214. Details of mounting posts 213 and 214 are disclosed in FIG. 32g.

The source of the pressurized oil is from either one or the other of the connecting rings, 57 and 59, cut into mounting plate 1 (see FIG. 11) and reverse end plate 6 (see FIG. 14), respectively. As noted above, the polarity of pressure is always opposite in rings 57 and 59. When the transmission is in the forward mode and the engine is actually pulling, the polarity of the ring 57 in mounting plate 1 (FIG. 11) is positive, and the ring 58 in reverse end plate 6 (FIG. 14) is negative.

Figure 12A:
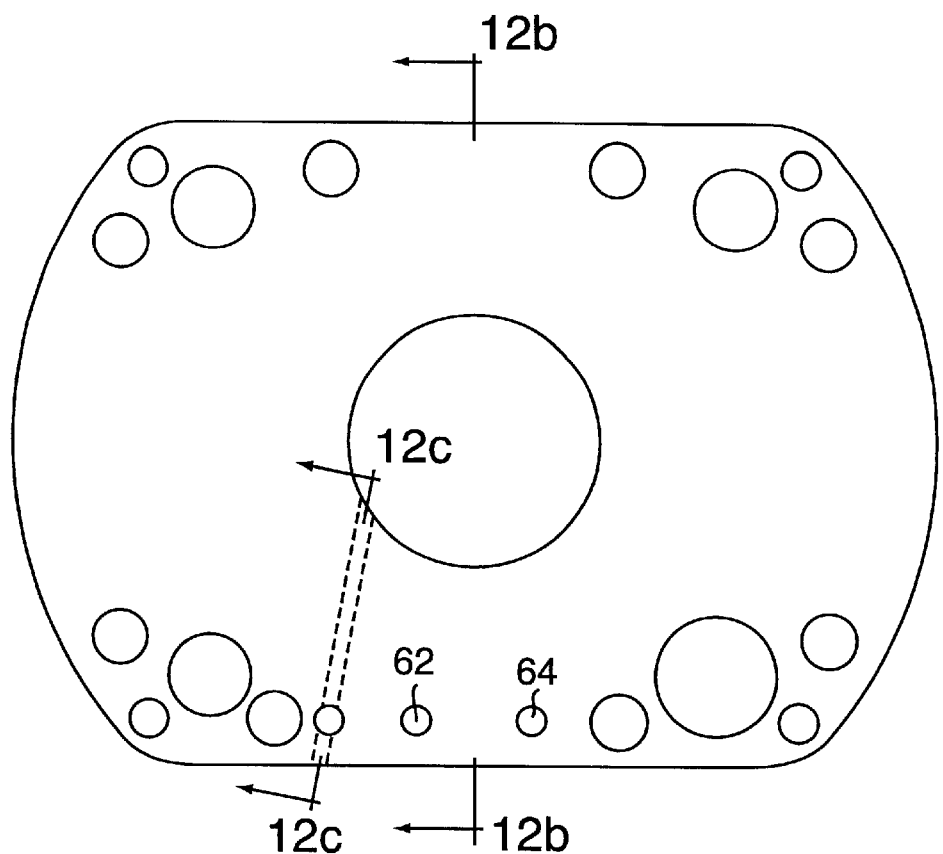
FIGS. 12a–c. are schematic views of the forward end plate of a preferred embodiment of the present invention.
Figure 12C:
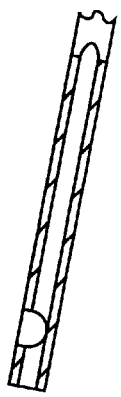
Figure 12B:
Figure 13A:
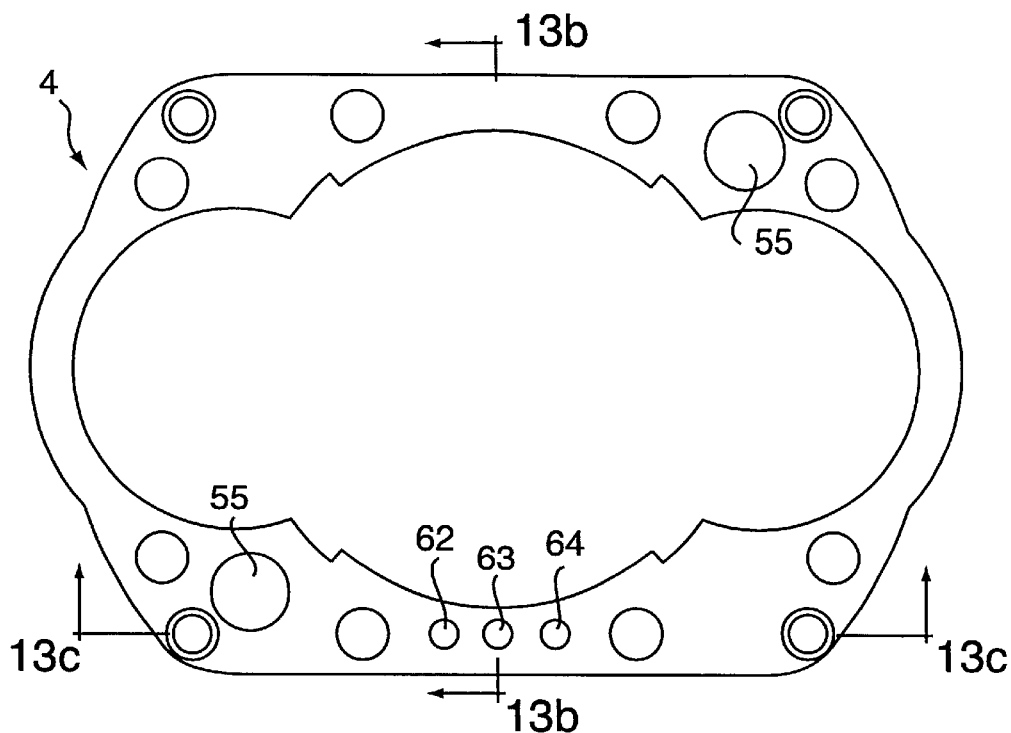
FIGS. 13a–c are schematic views of the cavity divider of a preferred embodiment of the present invention.
Figure 13B:
Figure 13C:
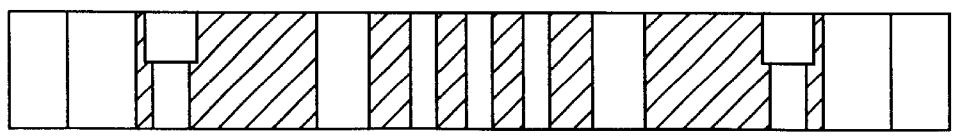

Referring to FIGS. 7 and 8, oil pressure to move the idler assembly 36 is supplied by oil flow in three 3/16 inch bores 62, 63, 64 that extend the length of forward cavity block 3, (FIG. 8) through the cavity divider 4 (FIG. 13) and through the reverse cavity block 5 (FIG. 7). Only the two outer bores 62 and 64 extend through forward end plate 2 (see FIG. 12) and reverse end plate 6 (see FIG. 14). The center bore 63 extends from the F plane 94 to the C plane 95 (see FIG. 2) and is open to the A and B plenums to let oil flow in and out of the plenums.

Referring to the section B—B view of the forward cavity block FIG. 8, and the section C—C view of the reverse cavity block FIG. 7, check valves 22 and 23 (FIG. 7) and 67 and 68 (FIG. 8) prevent the polarity of oil in bores 62 and 64 from changing when the polarity in rings 57 and 58 changes from positive to negative and vice versa. Check valves 67 and 23 are in positive bore 62 with arrows pointing toward the control apparatus 20. Check valves 68 and 22 are in the negative bore 64 shown with arrows pointing away from the control apparatus 20. Pressurized oil from rings 57 and 59 (see FIGS. 12 and 14) reaches bores 62 and 64 through T-shaped channels 65 and 66 in mounting plate 1 (FIG. 11) and reverse end plate 6 (FIG. 14) respectively.

Figure 8A:
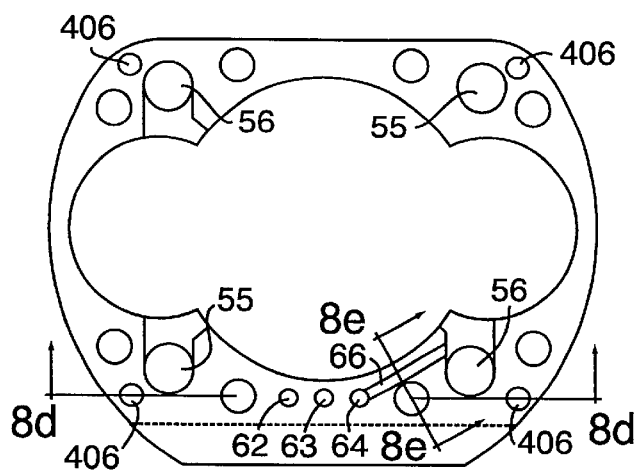
FIGS. 8a–h are schematic views of the forward cavity block of a preferred embodiment of the present invention.
Figure 8B:
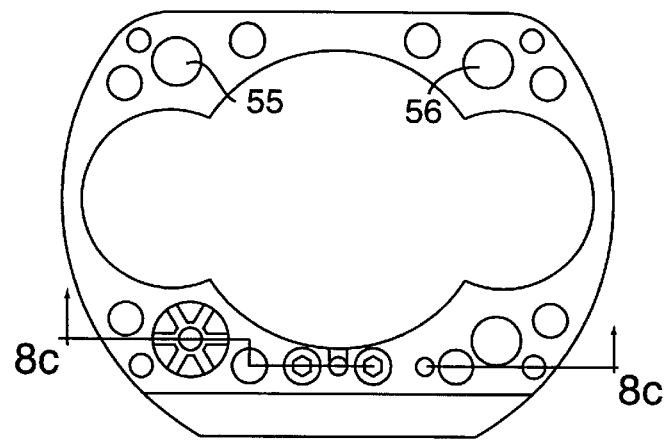
Figure 8C:
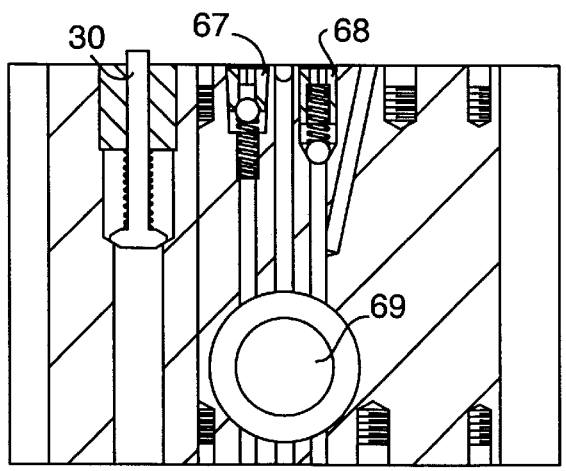
Figure 8D:
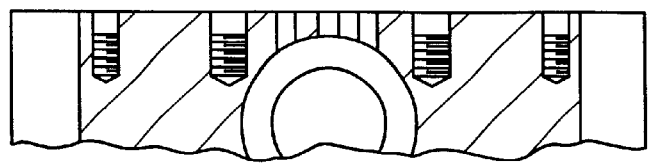
Figure 8E:
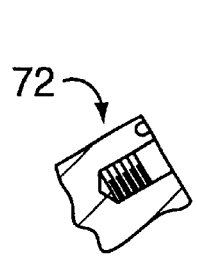
Figure 8G:
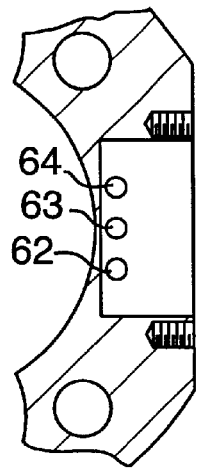
Figure 8H:
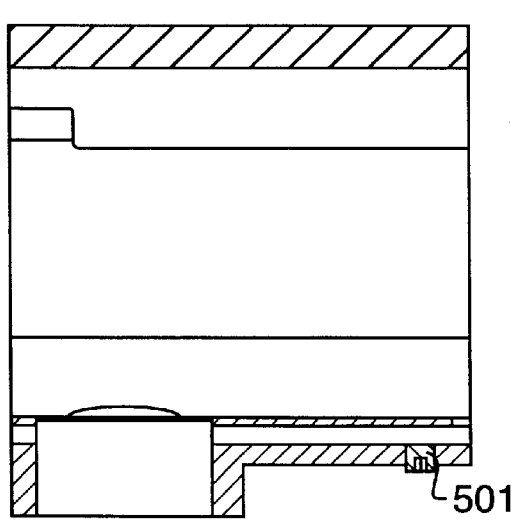
Figure 8F:
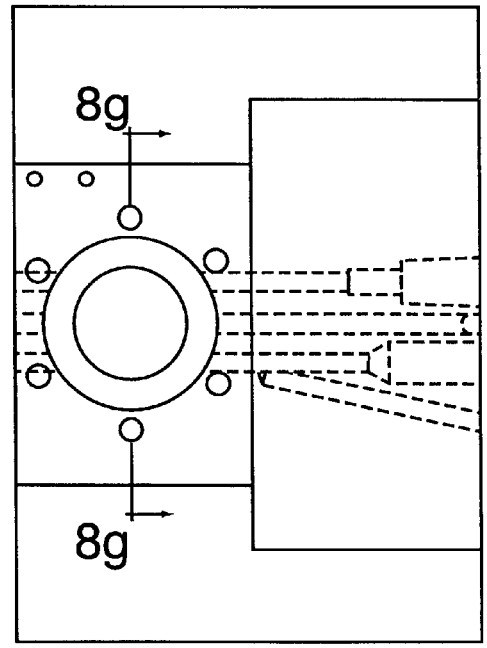
Figure 9:
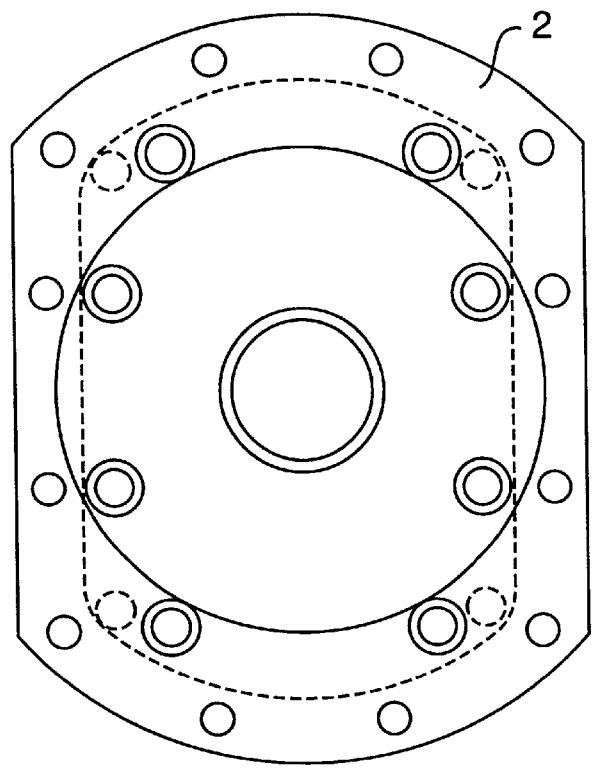
FIG. 9 is a schematic view of the forward end plate of a preferred embodiment of the present invention.
Figure 10:
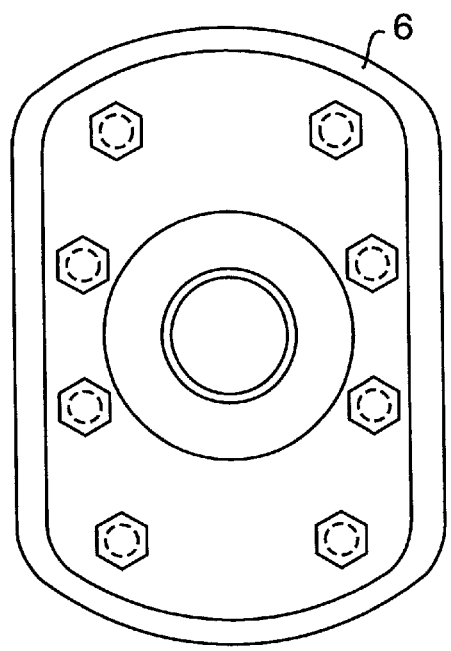
FIG. 10 is a schematic view of the exterior of the reverse end plate of a preferred embodiment of the present invention.

Whenever the speed of the vehicle changes rapidly causing the polarity to reverse itself in the connecting rings 57 and 59 of mounting plate 1 (FIG. 11) and reverse end plate 6 (FIG. 14), or when the transmission is at the zero point, the oil pressure in the control circuit may get too low for the control to work. To maintain oil pressure, a minimum pressure circuit is included in the present invention. Referring to FIG. 8c, the minimum pressure circuit includes a valve 3A, its valve guide 3B and a coil spring 3C. It will be understood by those skilled in the art that the dimensions of the coil spring that forces the valve to close should be calculated so as to maintain adequate pressure without substantial loss of power. Referring to FIG. 8a, and its Section E—E view 72 of the forward cavity block 3 (FIG. 8) a short channel 66 runs from a "B" passage 56 to the positive bore 64 to maintain adequate pressure at all times.

Referring to FIG. 27, in the preferred embodiment, the control apparatus includes a rack driven gear 205 in mesh with rack 37 in transfer slide 19 (see also FIGS. 3 and 4). Whenever the idler assembly moves axially in either direction, its position is transmitted to the computer monitor (not shown) by gears in the control apparatus. A channel sleeve 202 allows pressurized oil to enter into the control apparatus 20 from positive bores 62 and to exit through negative bores 64. Referring to FIG. 31, section C—C, the channel sleeve 202 has two 3/16 throughholes 80 cut through to the inside diameter 81. Throughholes 80 are located at 30° from an axis 82 which extends through the centerline of the channel sleeve 202 and are aligned with bores 62 and 64 of forward cavity block 3 (See FIG. 8). The throughholes 80 are also aligned with openings 83 in the sleeve-with-ports 203 detailed in FIG. 29.

Referring to FIG. 31, section D—D, the channel sleeve 202 also includes two channels 84, preferably 3/16 inch deep, extending from 3/32 inch on one side 85 to 1/8 inch on the opposite side 86. As shown, from each channel 84 a 3/16 inch throughhole 87 extends through to the inside diameter 81 of the channel sleeve 202. The channels 84 are located at 30° from axis 82 and are aligned with the negative bores 64 of forward cavity block 3. The two 3/16 throughholes 87 are positioned to allow oil from the control valve 204 to exit through eight 1/8 inch throughholes 88 (See FIG. 29) in the sleeve with ports 203.

Referring still to FIG. 31, two other channels 89, 90, on opposite sides of control sleeve 202 are shown in section A—A. Channels 89 and 90 extend 1/16 inch from one end 91 of the control sleeve as shown. Each channel 89, 90 has a 3/16 inch thoughhole 92 and 93 respectively, each of which is aligned with a corresponding opening in sleeve with ports 203. The channels 89 and 90 are also aligned with the center bores 63 that extend from the control apparatus 20 to C and F planes, 94 and 95 respectively, (see FIG. 2) to communicate with the A and B plenums 45 and 46. (See FIG. 1.) Referring to FIG. 29, the sleeve-with-ports 203 is basically a bushing with large grooves and with an outer diameter designed to fit the inside diameter of channel sleeve 202 and an inside diameter designed to fit around the outer diameter of control valve 204. As seen in section A—A, of FIG. 31, and FIG. 30 control valve 204 has an opening aligned on one side with one channel 89 of channel sleeve 202 and another opening aligned with channel 90 of channel sleeve 202 on the opposite side of the control valve 204. It can be seen from end views 96 and 97 of the control valve 204 (FIG. 30) that an opening in the control valve 204 communicates with openings 105 in the sleeve with ports 203 as shown in end views 98 and 99 of FIG. 29. Likewise, from top views 100 and 101 (FIG. 30) and 102 and 103 (FIG. 29), it can be seen that openings in control valve communicate with exit holes 88 in the sleeve-with-ports 203.

Referring to section A—A of FIG. 27, one of two ³⁄₁₆ inch throughholes 83 of sleeve-with-ports 203 (FIG. 29) is open to one side of the valve 204 and the other ³⁄₁₆ inch throughhole communicates with the opposite side of the valve 204 and the exit holes 88 in the sleeve-with-ports 203.

Figure 32D:
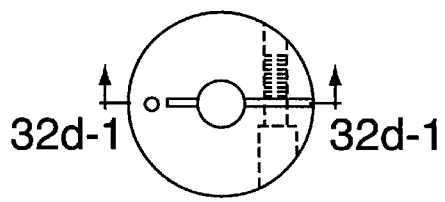
Figures 1, 32D:
Figure 32F:
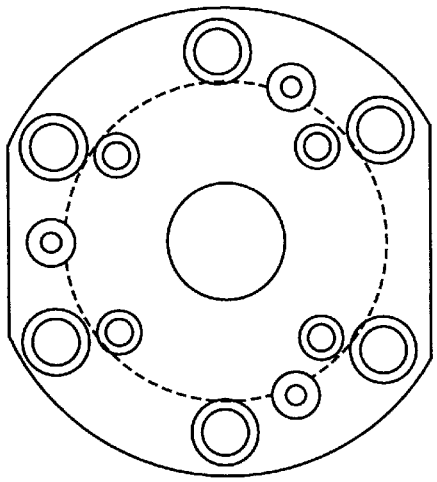
Figure 32E:
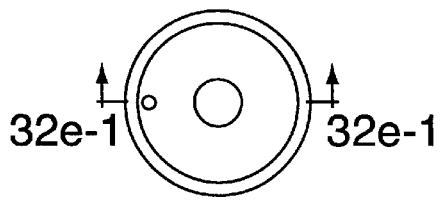
Figures 1, 32E:
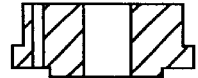
Figure 32G:
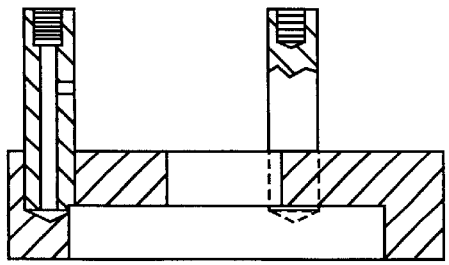

Referring still to FIG. 27, connected to sleeve-with-ports 203 is an 'out data' gear 206 which is driven by divider gear 209. The divider gear 209 and 'out data' gear 206 are detailed in FIGS. 32a and 32b respectively. The 'out data' gear 206, (FIG. 32b) meshes with the 'in' gear of the monitor (not shown). As noted above, the 'out data' gear 206 is driven by the divider gear, 209, which also meshes with pin driven gear 208. (See FIG. 32e) The rack driven gear 205 is driven by the rack 37 of transfer slide 19 in the idler assembly 39 (FIG. 20) and, in turn, drives the pin driven gear 208 (FIG. 32e) through a small pin which is located in the locking disc, 211. (FIG. 32d).

The control valve 204 (FIG. 30) is driven by 'in data' gear 207 (FIG. 32c), which meshes with the 'out data' gear of the monitor (not shown). The 'in data gear' 207 carries a small pin which limits it to a rotation of only 180°. The monitor mounting plate, 210, (See FIG. 27) has a cut out section, 215, visible in the top view of the control assembly, (FIG. 27) within which pin 216 may travel to allow the 'in data' gear to rotate the full 180°. Both sleeve-with-ports 203 (FIG. 29) and control valve 204, (FIG. 30), have tongue and groove connection to their respective gears.

Whenever a desired idler position has been reached, the ³⁄₁₆ inch throughholes, 83 of sleeve-with-ports 203 (FIG. 29) are completely blocked by the ³⁄₁₆ inch width of the control valve 204 (FIG. 30) and the control assembly is effectively locked in that position until a new order is given by the computer monitor for a new position.

As noted above, the idler assembly 36 has a maximum travel of 2 ¹¹⁄₁₆ inches. This is the distance which will cause the rack driven gear, 205, (FIG. 28) to rotate exactly one full revolution. But the sleeve-with-ports, 203, (FIG. 29) and the control valve, 204, (FIG. 30) rotate only 180°. This is the reason for the use of the divider gear, 209, detailed in FIG. 32a. In the preferred embodiment detailed herein, from neutral, the actual length of travel is 1 ¾ inches for the forward pump and ¹⁵⁄₁₆ inches for the reverse pump. For the control parts and their gears, this amounts to a rotation from zero degrees to 117 degrees for the forward pump and 63 degrees for the reverse pump.

It is very important, if the system is to work properly, that sleeve-with ports 203 (FIG. 29) be well synchronized with the 'out data' gear, 206 (FIG. 32b), so that when the idler assembly 36 has reached one or the other of its limits, both throughholes 83 the sleeve-with-ports 203 are completely blocked by the ³⁄₁₆ inch width of the control valve 204 (FIG. 30). At the same time the control valve 204 must have reached its corresponding limit inside the cutout 215 of monitor plate 210 (FIG. 27). A procedure to synchronize the 'out data' gear 206 with the sleeve-with-ports 203 is disclosed below.

It will be understood by one skilled in the art that the computer monitor also must be properly synchronized with the gear positions of the control apparatus. The pitch diameter of the monitor gears 206, 207, 208, and 209 does not necessarily have to be the same as that of the control gears 7, 8, 28 and 29. For instance, pitch diameters of the monitor gears could be reduced to ⅜ inch instead of 1 ¼ inch with thirty teeth instead of sixty.

The On-Off Valve

Referring to FIG. 19, the on-off valve 301 is basically a two-piece unit whose function is to completely disconnect the flow of oil between engine and wheels in a vehicle equipped with the step-less hydraulic power transmission of the present invention. The valve 302 puts the system in neutral whenever some engine work has to be done or if the vehicle needs to be towed. It works by either opening or closing a shunt line 350 that runs from an "A" to a "B" passage 55 and 56 respectively of reverse cavity block 5. The valve only has two positions: on or off. When the valve 302 is closed, the line is blocked and the "A" and "B" passages 55 and 56 are doing their job of carrying the oil to or from variable and non-variable pumps. When valve 302 is open, however, the flow of oil takes the path of least resistance and goes through the valve, regardless of whether the engine or the vehicle is moving the oil. Referring to FIG. 19a the valve 302 is shown closed. To avoid unintentional disconnection of the flow of oil while the engine is running, an interlock is included to ensure that the control apparatus 20 is in the neutral, or zero, position before the valve 302 can be switched from on to off.

Still referring to FIG. 19, a bracket, 306, is bolted to forward cavity block 3, (See FIG. 8) and secures a lock pin bracket, 307, which contains a coil spring on an interlock pin, 309. The lever bracket 306 also holds a lever, 308, which pivots about its holding bolt 311, which is bolted to lever bracket 306.

One end of the interlock lever 308 has a V shaped projection 312 which may enter one of the two notches 313 located 90° apart on the flange of the valve knob, 303. The other end of the interlock lever 308 is constantly being pushed on by the interlock pin 309 because of the pressure applied to it by the coil spring. The function of the interlock pin 309 is to keep the 'in data' gear 207 from rotating from the neutral position. The interlock pin 309 is shown in detail in FIG. 19d.

Figure 19C:
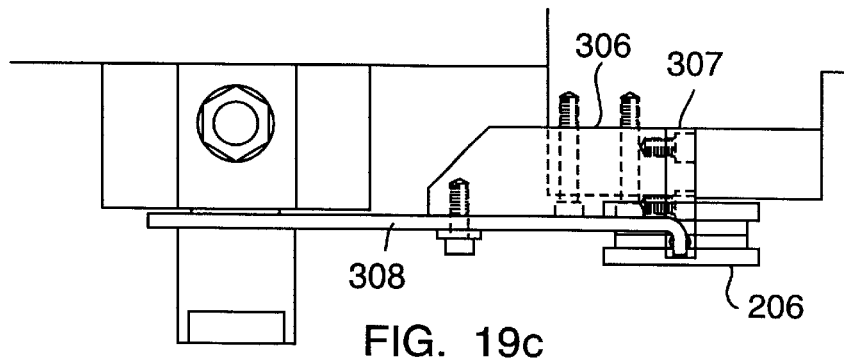
FIGS. 19a–d are schematic views of the on-off valve unit according to a preferred embodiment of the present invention.
Figure 19B:
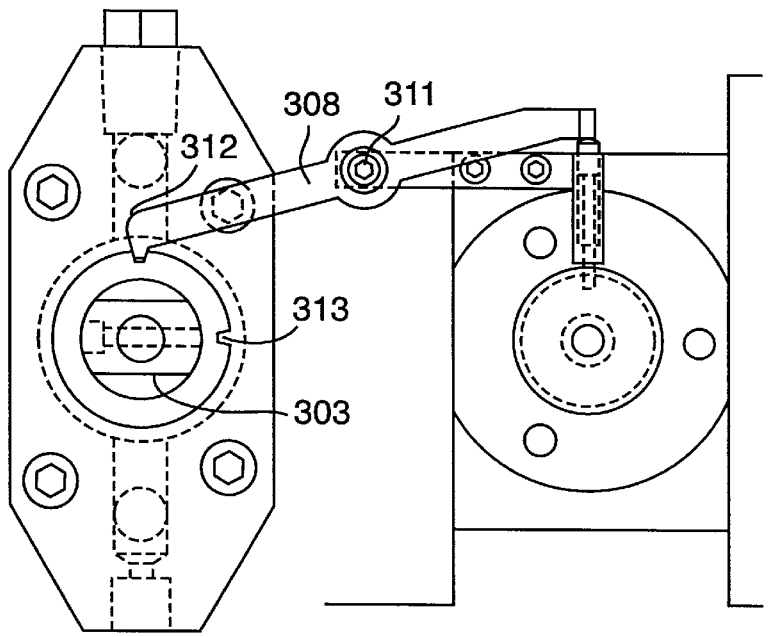
Figure 19D:
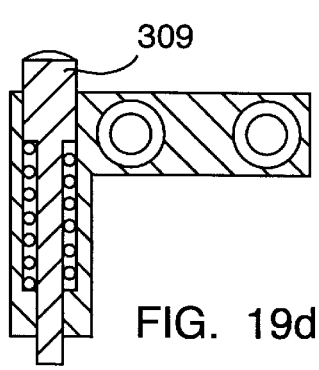
Figure 19A:
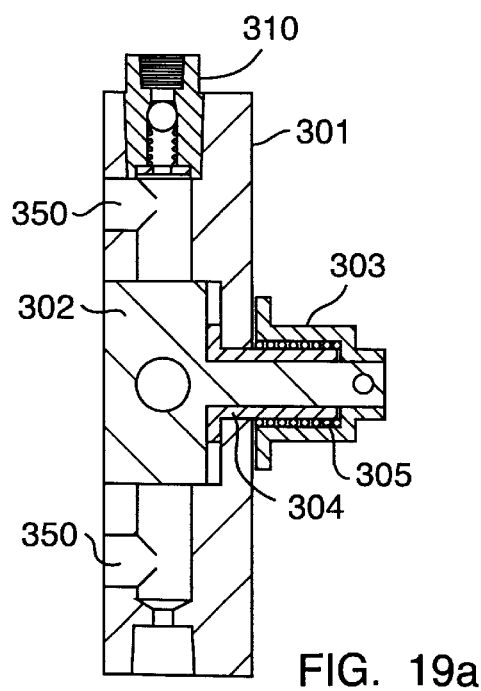

The purpose of the pin 309, See FIG. 19d, is to keep the "in" data gear, 207, from rotating from neutral position by entering a hole which is located on the outside diameter of it.

If a pressure, manual or otherwise, is applied on the lever end, the pin 309 may be pushed into the hole of the gear 207 while the other end of the lever is disengaged from one notch 313 or the other of the knob 303 flange.

In addition to the two flange notches 313, the valve itself 302 has a 90° segment cutout on the bottom of it, for a set-screw to enter in and limit its rotation to just the quarter turn.

Method of Assembly

In the preferred embodiment of the step-less hydraulic power transmission of the present invention 100 particular attention is given to hole positions for screws or bolts. Hole positions are preferably such that parts can only fit in one way thus eliminating the need for detailed assembly procedures and avoiding assembly errors.

Some internal parts, such as valve 3A and valve guide 3B of the forward cavity block 3 (See sec B—B view of FIG. 8) and the check valves 67 and 68 of the forward cavity block 3 (FIG. 8) and 23 and 22 of the reverse cavity block 5 (FIG. 7) should be installed and tested prior to assembling the main parts of the transmission. Likewise idler assembly parts, such as spacer rings, 16 (See FIG. 1) should be assembled with an arbor in place and bolted to respective idler assembly plates 14 and 15, before proceeding with the assembly of the main parts. The arbor should be removed for final assembly later.

In the preferred embodiment, all parts should have at least one face stamped with a plane identifying letter before assembly Referring to FIG. 35, to facilitate assembling the idler assembly 36, a special fixture 400 can be used to keep the main gear and its idlers together while either forward cavity block 3 or cavity divider 4 is eased over them. The fixture 400 is simply a block, 4 ¼ in. wide and about 5 ¹⁵⁄₁₆ in. long with a plate ⁵⁄₁₆×2 ¼×4 ½ in. bolted at each end of it. Three flats 402 are cut on one face of the block to hold the central gear and its two idlers during assembly.

With the fixture 400 on the surface plate 401 the main gear is placed with its longer end 407 (see FIG. 24) on the plate 401. Next, the roller assemblies and seal rings are installed on the two idlers, taking care that the smaller roller assembly is at the proper end of the idler gears. The idlers are then lowered onto the fixture 400 taking care to ensure that the idlers are oriented such that the shorter end 409 (See FIG. 22) is in mesh with the shorter end 408 of main gear 7 (See FIG. 24).

When the two idlers are fully meshed with the main gear, the group (main gear and two idlers) are pushed in so that the rings are close to or touching the fixture 400. The idlers should be assembled with one end either flush with or protruding slightly from the ring. Next, the dividers 17 and transfer slides 18 and 19 are assembled. First, one of the dividers is lowered into the gap of the main gears. When in place, both sides of the divider will be resting on seal rings. Then the transfer slide 19 having the gear rack 37 is to bolted to idler assembly plate 15, taking care to ensure that it is oriented properly. When the transfer slide is in place, it will be in contact with both gear and dividers 17. At this point, the slide is free to move axially along the main gear and it should be left with both ends protruding a little from the ends of the idlers. In this position, it will be easier to assemble forward cavity block 3 and cavity divider 4.

With the transfer slides on the assembly plate 401, either cavity block 3 or cavity divider 4 may be easily installed. If the transfer slide 19 is positioned an inch or so beyond the seal rings, cavity divider 4 is installed, then with the transfer slide pushed in so that its opposite end protrudes beyond the idlers, forward cavity block 3 is installed. When both forward cavity block 3 and cavity divider 4 seated properly the fixture 400 is no longer needed. The whole idler assembly may be rolled to one side and the fixture 400 removed.

Now with the control side of the assembly on the surface plate 401, cavity divider 4 has to be removed to make room for the other divider. When this part has been installed so that it is in contact with both rings, the other transfer slide, 18, is installed and cavity divider 4 can again slide over the rings, and four ¼" dia. bolts 406 (See FIG. 8 Sec. A—A) can be put in to finally pull forward cavity block 3 and cavity divider 4 together.

Next, idler assembly plates 14 and 15 (FIG. 20) with their arbors and seal rings 12 are assembled. In the preferred embodiment, one end of the arbors has a woodruff key. The end with the woodruff key goes into idler assembly plate 15 first. Both arbors are thus assembled and attached with a nut. Then, the seal ring is put in assembly plate 15 and the whole unit can be inserted in the idlers while the seal ring slides onto the main shaft. If the transfer slides are not already installed inside cavity block 3, they can be pushed in place. When they are fully in, their screws can be put in through the plate and be tightened.

Applying the same procedure to idler assembly plate 14 and main sealing ring 12 the idler assembly will be ready to work.

Next, the reverse cavity block 5 slides over the idler assembly until it reaches cavity divider 4. Reverse end plate 6 is then bolted to reverse cavity block 5 with four quarter inch bolts and assembled with the idler assembly. The reverse pump 39 is then bolted to the forward pump with eight long bolts that reach into forward cavity block 3. Finally the forward end plate 2 is bolted in place with its four quarter inch bolts and mounting plate 1 assembled to nearly complete the assembly of the continuously variable pump 101.

As in the idler assembly, the arbors of the non-variable pump have a woodruff key at one end to prevent them from rotating while a nut is being put on. This end of the arbors has to go in the end plate, 26, (FIG. 17) after the spacer rings, 31, have been put in.

Figure 16A:
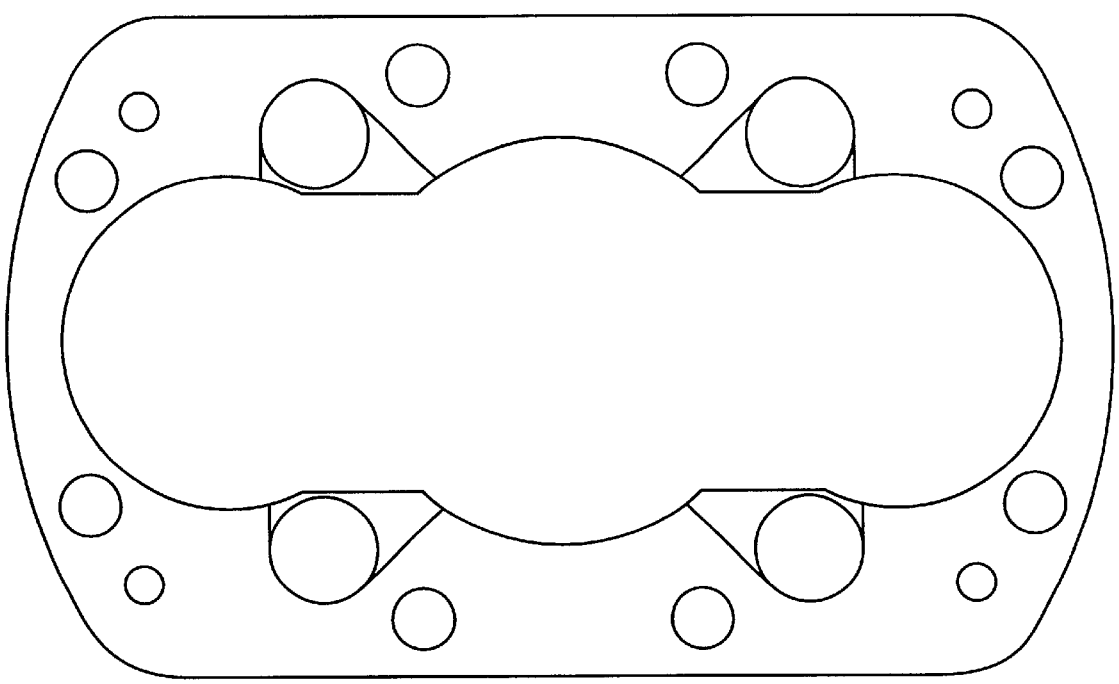
FIGS. 16a–b are schematic views of the non-variable cavity block according to a preferred embodiment of the present invention.
Figure 16B:
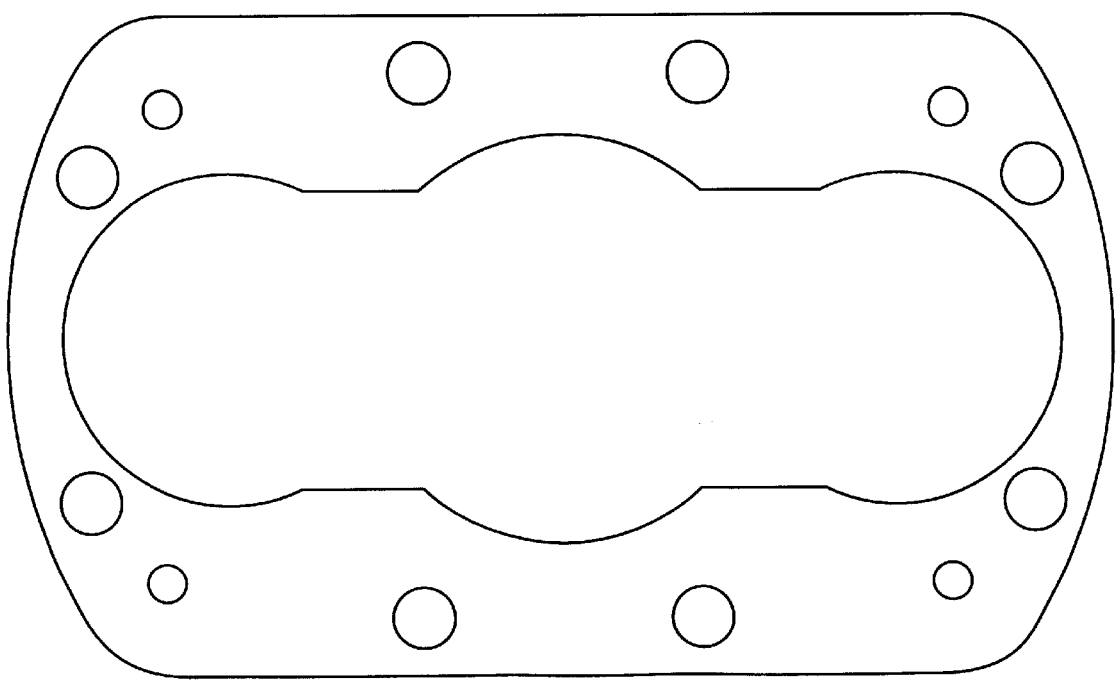

When the arbor nuts have been properly tightened, the idlers, 29, with their roller assemblies in place, are put on their arbors. Then the central gear, 28, is inserted. Next the cavity block, 25, (FIG. 16) can be slipped over the idlers to come in contact with end plate 26. Then the four quarter inch bolt should be put in, screwed into the block and be properly tightened.

Next, the non variable end plate 24 (FIG. 15) with its two spacer rings may be put on the arbors and, as the end plate 24 is pushed in, the central gear will enter the plate. When the end plate is in contact with the cavity block, two nuts may be screwed in and tightened. Then the four quarter inch bolts may be put through the end plate, screwed into cavity block 25 (FIG. 16) and tightened.

The narrower Hyatt bearing should have a slide fit onto the output shaft, 35, and inside end plate 26 as well. With the bearing on the shaft, the two Hyatt bearings can be inserted. The spacer sleeve, 34, may help to seat the bearing on the shaft. If needed, the cover, 27, (FIG. 18) with its seal parts inside, can be used to pushing the parts final position.

Next, the cover 27 is installed over the output shaft.

Finally, the continuously variable pump and the non-variable pump are joined together, taking care so that no binding takes place when the shaft starts to enter the main gear of the continuously variable pump.

When the two pumps are in contact, the long bolts may be screwed in to the reverse end plate and tightened to a predetermined torque.

Synchronizing the Control Apparatus

In the control apparatus (FIG. 27) the "in" data gear, 206, is keyed to the valve, 204, and is limited to a rotation of 180°, by the limits of the cutout of monitor plate 210. The "out" data gear, 206, is also limited to a rotation of 180°, but in this case, the limits are the result of the idler assembly position in its travel. When the system is properly synchronized, the idler assembly will move to whatever position the "in" data gear, 207, calls for and the "out" data gear, 206, will follow every movement of the "in" gear.

To synchronize the gears, the transmission should be secured to a test bed. A shaft that engages the main gear may be driven by an electric motor. An oil reservoir is connected from the pressure control valve and into the check valve which is threaded into the on-off valve.

A piece of tape can put on one side of the output shaft to mark direction and speed of rotation. The speed of the input shaft doesn't really matter, but it should remain constant while the test is being made.

The reservoir (See FIG. 33) should be filled and the electric motor turned on and be left on for as long as it will take for the oil to be mostly free of air. To help in getting some of the air out of the "A" and "B" plenurns, the plugs in the test holes 500 and 501 may be removed, one at a time, as the idler assembly is pushed toward one or the other hole which is open at that moment.

When the oil is almost free of air, both plugs can be put into test holes 500 and 501 and the electric motor can be switched on.

The object of the synchronizing is to get the two data gears, 206 and 207, to agree with each other. The "in" gear, 207, is keyed to the control valve, 204, and is driven by the computerized monitor. The "out" gear is keyed to the sleeve-with-ports, 203, and is driven by the gear train, starting with the rack driven gear, 205, and ending with the divider gear, 209. The "out" gear, 206 in turn, drives the monitor "in" gear 207 to inform it of the present position of the idler assembly.

When the control apparatus is properly synchronized, the "out" gear 206 will follow every move that the "in" gear 207 makes. But when the control is initially assembled in the forward cavity block 3 opening, chances are that the position of the control will not match that of the idler assembly, thus requiring an adjustment. That is the function of the locking disc 211.

Referring to FIG. 27, the locking disc 211 is split and has a small cap screw to force its two halves closer to each other and lock it onto the stem of the rack driven gear, 205. Without any pressure from the cap screw, the disc 211 should have a snug fit, which would be enough to drive the gear train but not tight enough to prevent it from being turned by hand to make adjustments. The disc 211 is connected to gear 208 by a pin 216, which goes through both disc and gear.

When everything is in place, except the monitor, both data gears are visible and the "in" gear, 207, may be rotated by hand. By pushing on the interlock lever, 308 (See FIG. 19), while rotating gear 207 by hand, the interlock pin, 209, may be forced into the zero position hole on the side gear 207. Then, while keeping the pressure on the interlock lever, the on-off valve knob, 303 (See FIG. 19) may be rotated just a little to keep the interlock pin in the side hole of the gear.

From its zero position the gear may be rotated clockwise as much as 117 degrees, at which position the forward pump runs at maximum capacity for maximum forward output shaft speed. And from the same zero position, a counter-clockwise rotation of 63 degrees would result in maximum reverse output shaft speed.

With the control valve gear at the zero point and the interlock pin in its hole, the electric motor may be turned on, causing the idler assembly to move to some position and the output shaft to turn. If the output shaft turns in the same direction as the input shaft, this means the transmission is in the forward mode. By bring the speed to zero by rotating the "out" data gear, the gears may be synchronized.

If the valve gear is unlocked and we wanted to increase the forward speed, we would rotate the valve to the right but to do the same thing with the valve locked up in the zero position we would have to rotate the "out" gear in the opposite direction. This would be done by rotating the locking disc by hand.

To finally arrive at a full stop for the output shaft would probably require going back and forth a few times but when it does happen, the operation is complete. Then the valve gear may be unlocked and the locking pin retracted by just returning the knob of the interlock lever, 303, to its original position.

Having adjusted the gears, the idler assembly can be moved to any position from maximum reverse to maximum forward by rotating the valve gear. This is what the monitor will do when it is mounted on its plate and both sets of gears are in mesh.

Without lubrication of the roller bearings, the least amount of wear could become a source of trouble. In the preferred embodiment, and as detailed herein, the small holes and clearances between idlers and their arbors are specifically designed to allow lubrication of all parts. In the continuously variable pump, the flow of oil runs from plenum A to plenum B, or vice versa, depending on the polarity at the time. In the non-variable pump, going through the idlers and their bearings, the flow of oil can start from the positive side of the pump and end up in the connecting ring of reverse end plate 6. It can go through the narrow, Hyatt bearing, 32 out into the central gear, 28, to the point where the two central gears meet, seep between the bushing of output shaft 106 and the central hole of the main gear and end up in the negative bores for the control apparatus.

This computer monitor may be custom designed by one skilled in the art. Referring to FIG. 33, inputs to the computer monitor may include information from test holes 500 and 501, brake, accelerator and engine R.P.M as well as idler position feedback, but one of ordinary skill in the art, apprised of the disclosure herein can make certain changes in the above constructions without departing from the spirit or scope of the invention.

As shown in FIG. 33, the oil reservoir for the transmission system need not to be built for high pressure if a regulator is used to keep the pressure low regardless of the pressure in the transmission. The reservoir could be located in any convenient place but it preferably has either a class tube or a see-through window instead of a dipstick.

It will thus be seen that the invention efficiently obtains the objects set forth above, as well as those made apparent from the disclosure herein. It is intended that tall matter included in the present disclosure be interpreted as illustrative and not in a limiting sense, as one of ordinary skill in the art, apprised of the disclosure herein, can make certain changes in the above constructions without departing from the spirit or scope of the invention.

Accordingly, it is understood that the following claims are intended to cover generic and specific features of the invention described herein, and all statements of the scope of the invention which may as a matter of language might be said to fall therebetween.

What is claimed is:

1. A hydraulic power transmission system having a gear assembly, said hydraulic power transmission system comprising:

a first driven gear of said gear assembly having a plurality of first helical gear teeth formed thereon;

a second gear of said gear assembly having a plurality of second helical gear teeth formed thereon, said first helical gear teeth and said second helical gear teeth selectively meshing with one another; and each of said first helical gear teeth and each of said second helical gear teeth define an outer periphery, wherein contact between any of said first helical gear teeth and any of said second helical gear teeth occurs at only one contact point on said outer periphery of any of said first helical gear teeth and any of said second helical gear teeth when said first driven gear and said second gear are meshing.

2. The hydraulic power transmission system having a gear assembly according to claim 1, wherein:

said first helical gear teeth and said second helical gear teeth selectively contact one another along a locus of contact points defining a pitch circle, wherein only two of said contact points are defined on said outer periphery of each of said first helical gear teeth and each of said second helical gear teeth by the intersection of said pitch circle with said outer periphery.

3. The hydraulic power transmission system having a gear assembly according to claim 1, wherein:

said outer periphery is defined by a substantially uniform radius as measured from a midpoint of a chord connecting each of said two contact points on said periphery of each of said first helical gear teeth and each of said second helical gear teeth.

4. The hydraulic power transmission system having a gear assembly according to claim 3, wherein:

said substantially uniform radius is equal to a chordal addendum of each of said first helical gear teeth and each of said second helical gear teeth.

5. The hydraulic power transmission system having a gear assembly according to claim 4, wherein:

said chordal addendum of each of said first helical gear teeth is substantially equal to said chordal addendum of each of said second helical gear teeth.

6. The hydraulic power transmission system having a gear assembly according to claim 4, wherein:

said chordal addendum of each of said first helical gear teeth is not substantially equal to said chordal addendum of each of said second helical gear teeth.

7. The hydraulic power transmission system having a gear assembly according to claim 4, wherein:

said hydraulic transmission system includes a continuously variable transmission pump and a non-variable transmission pump; and said non-variable transmission pump drives an output shaft of said hydraulic power transmission system.

8. The hydraulic power transmission system having a gear assembly according to claim 7, wherein:

said second gear is an idler gear which selectively moves along an axial length of said first driven gear under in response to a control apparatus, wherein a first plenum and a second plenum are defined within a cavity block of said hydraulic power transmission system, said first plenum and said second plenum being disposed adjacent to opposing distal axial ends of said idler gear; and said first driven gear is driven by a engine crankshaft extending into said cavity block, said engine crankshaft being coaxially aligned with said first driven gear.

9. The hydraulic power transmission system having a gear assembly according to claim 8, wherein:

said first plenum and said second plenum vary inversely in size in dependence upon a position of said idler gear along said axial length of said first driven gear; and said continuously variable transmission pump includes a forward pump and a reverse pump, said forward pump including said first plenum and said reverse pump including said second plenum.

10. The hydraulic power transmission system having a gear assembly according to claim 9, wherein:

said control apparatus monitors operating parameters of said hydraulic power transmission system and selectively varies the size of said first plenum and the size said second plenum by selectively moving said idler gear along said axial length of said first driven gear, thereby proportionally varying the rotational speed of said output shaft.

11. The hydraulic power transmission system having a gear assembly according to claim 10, wherein:

said operating parameters include the rotational speed and direction of said engine crankshaft, as well as a position feedback signal indicative of a position of said idler gear along said axial length of said first driven gear.

12. The hydraulic power transmission system having a gear assembly according to claim 9, wherein:

said forward pump and said reverse pump exchange a hydraulic fluid with said non-variable pump through hydraulic passages;

said control apparatus causes an increase in the amount and pressure of said hydraulic fluid which is exchanged between said forward pump and said non-variable pump by moving said idler gear along said axial length of said first driven gear in a first direction, said first direction reducing the size of said first plenum; and said control apparatus causes a decrease in the amount and pressure of said hydraulic fluid which is exchanged between said forward pump and said non-variable pump by moving said idler gear along said axial length of said first driven gear in a second direction, said second direction increasing the size of said first plenum.

13. The hydraulic power transmission system having a gear assembly according to claim 12, wherein:

said control apparatus causes an increase in the amount and pressure of said hydraulic fluid which is exchanged between said reverse pump and said non-variable pump by moving said idler gear along said axial length of said first driven gear in said second direction, said second direction reducing the size of said second plenum; and said control apparatus causes a decrease in the amount and pressure of said hydraulic fluid which is exchanged between said reverse pump and said non-variable pump by moving said idler gear along said axial length of said first driven gear in said first direction, said first direction increasing the size of said first plenum.

14. The hydraulic power transmission system having a gear assembly according to claim 13, further comprising:

a third gear of said gear assembly having a plurality of third helical gear teeth formed thereon, said first helical gear teeth and said third helical gear teeth selectively meshing with one another, said third helical gear teeth having substantially the same dimensional characteristics as said second helical gear teeth; and said third gear being oriented within said cavity block on an opposing lateral side of said first driven gear from that of said second gear.

15. The hydraulic power transmission system having a gear assembly according to claim 14, wherein:

said third gear is an idler gear.

16. A method for providing a continuously variable hydraulic transmission system, said hydraulic transmission system including a gear assembly, an engine crankshaft, an output shaft, a hydraulic fluid and a control apparatus, said method comprising the steps of:

shaping a first driven gear of said gear assembly to include a plurality of first helical gear teeth radiating outwardly therefrom;

shaping a second gear of said gear assembly to include a plurality of second helical gear teeth radiating outwardly therefrom, said first helical gear teeth and said second helical gear teeth being selectively meshable with one another; and forming each of said first helical gear teeth and each of said second helical gear teeth so as to define an outer periphery, wherein contact between any of said first helical gear teeth and any of said second helical gear teeth occurs at only one contact point on said outer periphery of any of said first helical gear teeth and any of said second helical gear teeth when said first driven gear and said second gear are meshing.

17. The method for providing a continuously variable hydraulic transmission system, said hydraulic transmission system including a gear assembly, an engine crankshaft, an output shaft, a hydraulic fluid and a control apparatus according to claim 16, wherein said forming step further includes the steps of:

forming said first helical gear teeth and said second helical gear teeth to selectively contact one another along a locus of contact points defining a pitch circle, wherein only two of said contact points are defined on said outer periphery of each of said first helical gear teeth and each of said second helical gear teeth by the intersection of said pitch circle with said outer periphery; and defining said outer periphery by a substantially uniform radius as measured from a midpoint of a chord connecting each of said two contact points on said periphery of each of said first helical gear teeth and each of said second helical gear teeth, said substantially uniform radius being equal to a chordal addendum of each of said first helical gear teeth and each of said second helical gear teeth.

18. The method for providing a continuously variable hydraulic transmission system, said hydraulic transmission system including a gear assembly, an engine crankshaft, an output shaft, a hydraulic fluid and a control apparatus according to claim 17, further includes the steps of:

controlling said second gear to selectively moves along an axial length of said first driven gear under in response to a control apparatus, wherein a first plenum and a second plenum are defined within a cavity block of said continuously variable hydraulic transmission system, said first plenum and said second plenum being disposed adjacent to opposing distal axial ends of said second gear; and driving said first driven gear by a engine crankshaft extending into said cavity block, said engine crankshaft being coaxially aligned with said first driven gear.

19. The method for providing a continuously variable hydraulic transmission system, said hydraulic transmission system including a gear assembly, an engine crankshaft, an output shaft, a hydraulic fluid and a control apparatus according to claim 18, further includes the steps of:

varying a size of said first plenum and said second plenum in dependence upon a position of said second gear along said axial length of said first driven gear; and including a forward pump and a reverse pump in said continuously variable hydraulic transmission system, said forward pump including said first plenum and said reverse pump including said second plenum.

20. The method for providing a continuously variable hydraulic transmission system, said hydraulic transmission system including a gear assembly, an engine crankshaft, an output shaft, a hydraulic fluid and a control apparatus according to claim 19, further includes the steps of:

monitoring said operating parameters of said continuously variable hydraulic transmission system with said control apparatus and selectively varying the size of said first plenum and the size said second plenum by selectively moving said idler gear along said axial length of said first driven gear, thereby proportionally varying the rotational speed of said output shaft.

21. The method for providing a continuously variable hydraulic transmission system, said hydraulic transmission system including a gear assembly, an engine crankshaft, an output shaft, a hydraulic fluid and a control apparatus according to claim 20, further includes the steps of:

including the rotational speed and direction of said engine crankshaft, as well as a position feedback signal indicative of a position of said idler gear along said axial length of said first driven gear, as said operating parameters.

* * * * *